(12) United States Patent
Glennon et al.

(10) Patent No.: US 12,408,793 B2
(45) Date of Patent: Sep. 9, 2025

(54) METHODS AND APPARATUS FOR AUTOMATING SHUTDOWN PROCESSES OF GAS GRILLS

(71) Applicant: Weber-Stephen Products LLC, Palatine, IL (US)

(72) Inventors: Kevin James Glennon, Hoffman Estates, IL (US); William Alexander Mecker, Kildeer, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 467 days.

(21) Appl. No.: 17/871,654

(22) Filed: Jul. 22, 2022

(65) Prior Publication Data

US 2023/0079421 A1 Mar. 16, 2023

Related U.S. Application Data

(60) Provisional application No. 63/242,901, filed on Sep. 10, 2021.

(51) Int. Cl.
*A47J 37/07* (2006.01)
*A47J 37/06* (2006.01)
*F23N 1/00* (2006.01)

(52) U.S. Cl.
CPC ....... *A47J 37/0786* (2013.01); *A47J 37/0647* (2013.01); *F23N 1/002* (2013.01)

(58) Field of Classification Search
CPC ..... A47J 37/0647; A47J 37/321; F23N 1/002; F24C 3/122; F24C 3/12

USPC .................... 126/39 R; 431/56, 82
See application file for complete search history.

(56) References Cited

U.S. PATENT DOCUMENTS

| | | | |
|---|---|---|---|
| 4,340,800 A | 7/1982 | Ueda et al. |
| 6,881,055 B2 | 4/2005 | Bird |
| 7,231,917 B2 | 6/2007 | Frederiksen |
| 7,669,590 B2 | 3/2010 | Oberhomburg |
| 7,793,649 B2 | 9/2010 | Barkhouse et al. |

(Continued)

FOREIGN PATENT DOCUMENTS

| | | |
|---|---|---|
| AU | 2014101175 A4 | 10/2014 |
| AU | 2015101746 A4 | 1/2016 |

(Continued)

OTHER PUBLICATIONS

U.S. Appl. No. 10/022,014, filed Jul. 17, 2018, Mateos Martin et al.
(Continued)

*Primary Examiner* — Avinash A Savani
(74) *Attorney, Agent, or Firm* — Avantech Law

(57) ABSTRACT

Example methods and apparatus for automating shutdown processes of gas grills are disclosed. An example grill includes a first burner, a second burner, a first burner valve operatively positioned between the first burner and a manifold of the grill, and a second burner valve operatively positioned between the second burner and the manifold. The example grill further includes a controller operatively coupled to the first burner valve and the second burner valve. In response to determining that a shutdown request has been received at the grill, the controller is to instruct the first burner valve and the second burner valve to close.

20 Claims, 10 Drawing Sheets

(56) References Cited

U.S. PATENT DOCUMENTS

| | | |
|---|---|---|
| 7,959,433 B2 * | 6/2011 | Huff ............... F23N 1/002 431/278 |
| 8,353,281 B2 | 1/2013 | Oberhomburg et al. |
| 8,413,648 B2 | 4/2013 | Querejeta Andueza et al. |
| 8,667,988 B2 | 3/2014 | Cadeau et al. |
| 8,863,734 B2 | 10/2014 | Shaffer |
| 8,925,568 B2 | 1/2015 | Legaspi et al. |
| 8,967,197 B1 | 3/2015 | Teel, Jr. |
| 9,289,096 B2 | 3/2016 | Barkhouse et al. |
| 9,317,046 B2 | 4/2016 | Gum |
| 9,329,606 B2 | 5/2016 | Barkhouse et al. |
| 9,345,362 B2 | 5/2016 | Huang et al. |
| 9,480,358 B2 | 11/2016 | Albizuri Landazabal et al. |
| 9,513,004 B2 | 12/2016 | Cadeau et al. |
| 9,557,059 B2 | 1/2017 | Kucera et al. |
| 9,645,584 B2 | 5/2017 | Kucera et al. |
| 9,752,783 B2 | 9/2017 | Huang et al. |
| 9,791,063 B2 | 10/2017 | Querejeta Andueza et al. |
| 9,841,191 B2 | 12/2017 | Johncock et al. |
| 9,844,298 B1 | 12/2017 | Parrish |
| 9,951,960 B2 | 4/2018 | Spanò |
| 9,980,321 B2 | 5/2018 | Sorenson et al. |
| 10,820,750 B2 * | 11/2020 | Chin ............... A47J 37/0647 |
| 2005/0058959 A1 | 3/2005 | Fortin et al. |
| 2006/0260603 A1 | 11/2006 | Shah |
| 2007/0117058 A1 | 5/2007 | Furuti et al. |
| 2007/0204858 A1 | 9/2007 | Abelbeck |
| 2007/0278319 A1 | 12/2007 | Jenkins et al. |
| 2009/0047610 A1 | 2/2009 | Teng et al. |
| 2009/0078245 A1 | 3/2009 | Chang |
| 2009/0104573 A1 | 4/2009 | Chen |
| 2010/0050882 A1 | 3/2010 | Lee |
| 2010/0132692 A1 * | 6/2010 | Shaffer ............ A47J 37/0713 99/333 |
| 2011/0045149 A1 | 2/2011 | Lee |
| 2012/0261599 A1 | 10/2012 | Legaspi |
| 2012/0318180 A1 | 12/2012 | Bang et al. |
| 2014/0261006 A1 | 9/2014 | Huang et al. |
| 2015/0108380 A1 | 4/2015 | Huang et al. |
| 2016/0035202 A1 | 2/2016 | Chin |
| 2016/0146647 A1 | 5/2016 | Silva |
| 2016/0178215 A1 | 6/2016 | Lee |
| 2016/0374510 A1 | 12/2016 | Albizuri Landazabal |
| 2017/0162346 A1 | 6/2017 | Ebrom et al. |
| 2017/0299195 A1 | 10/2017 | Bach |
| 2018/0008095 A1 | 1/2018 | Bennett et al. |
| 2018/0084946 A1 | 3/2018 | Gafford et al. |
| 2018/0125296 A1 | 5/2018 | Gafford |
| 2019/0045973 A1 | 2/2019 | Gill et al. |
| 2019/0137108 A1 | 5/2019 | Querejeta Andueza et al. |
| 2019/0203937 A1 | 7/2019 | Mangelli |
| 2019/0231125 A1 | 8/2019 | Gill et al. |
| 2019/0231126 A1 | 8/2019 | Gill et al. |
| 2019/0231127 A1 | 8/2019 | Gill et al. |
| 2019/0231131 A1 | 8/2019 | Gill et al. |
| 2019/0231133 A1 | 8/2019 | Gill et al. |
| 2019/0231135 A1 | 8/2019 | Gill et al. |
| 2019/0231142 A1 | 8/2019 | Gill et al. |
| 2019/0246837 A1 | 8/2019 | Becker et al. |
| 2019/0277498 A1 | 9/2019 | Fernandez et al. |
| 2019/0289119 A1 | 9/2019 | Colston |
| 2019/0309954 A1 | 10/2019 | Querejeta Andueza et al. |
| 2019/0313849 A1 | 10/2019 | Yin et al. |
| 2019/0374064 A1 | 12/2019 | Gill et al. |
| 2020/0003424 A1 | 1/2020 | Gutowski |
| 2020/0060472 A1 | 2/2020 | Gill et al. |
| 2020/0060473 A1 | 2/2020 | Gill et al. |
| 2020/0182460 A1 | 6/2020 | Bentley et al. |
| 2020/0187712 A1 | 6/2020 | Gill et al. |
| 2020/0232647 A1 | 7/2020 | Jung |
| 2020/0333013 A1 | 10/2020 | Querejeta Andueza et al. |
| 2020/0363067 A1 | 11/2020 | Cowan et al. |
| 2021/0000294 A1 | 1/2021 | Fox et al. |
| 2021/0038020 A1 | 2/2021 | Chin et al. |
| 2021/0095858 A1 | 4/2021 | Cowan et al. |
| 2021/0100393 A1 | 4/2021 | Bentley et al. |
| 2021/0196078 A1 | 7/2021 | Colston et al. |
| 2021/0199303 A1 | 7/2021 | Luis Alonso et al. |
| 2021/0356134 A1 | 11/2021 | Wilde et al. |
| 2022/0018539 A1 | 1/2022 | Scott |
| 2022/0099294 A1 | 3/2022 | Cowan et al. |
| 2022/0099302 A1 | 3/2022 | Cowan et al. |
| 2022/0146101 A1 | 5/2022 | Yang et al. |
| 2022/0146103 A1 | 5/2022 | Yang et al. |
| 2022/0146104 A1 | 5/2022 | Yang et al. |
| 2022/0170639 A1 | 6/2022 | Hooker |
| 2022/0228748 A1 | 7/2022 | French et al. |
| 2022/0322878 A1 | 10/2022 | Barnes et al. |

FOREIGN PATENT DOCUMENTS

| | | |
|---|---|---|
| AU | 2015305556 B2 | 8/2018 |
| CA | 2976434 | 11/2021 |
| CN | 109527983 A | 3/2019 |
| CN | 210043793 U | 2/2020 |
| CN | 111207419 A | 5/2020 |
| DE | 102008032453 A1 | 1/2010 |
| DE | 102008032447 B4 | 3/2014 |
| DE | 202018005046 U1 | 1/2019 |
| DE | 202019106141 U1 | 2/2020 |
| DE | 202019004298 U1 | 3/2020 |
| DE | 102018222833 A1 | 6/2020 |
| DE | 202020105925 U1 | 12/2020 |
| EP | 2789280 B1 | 1/2016 |
| EP | 2889540 B1 | 4/2017 |
| EP | 2469172 B1 | 2/2018 |
| GB | 1311083 A | 3/1973 |
| JP | 4060300 B2 | 3/2008 |
| JP | 5451257 B2 | 3/2014 |
| KR | 101626490 B1 | 6/2016 |
| KR | 20190006465 | 1/2019 |
| KR | 20200007316 | 1/2020 |
| WO | 2019012723 A1 | 1/2019 |

OTHER PUBLICATIONS

U.S. Appl. No. 10/060,547, filed Aug. 28, 2018, Teel, Jr.
U.S. Appl. No. 10/151,493, filed Dec. 11, 2018, French et al.
U.S. Appl. No. 10/180,691, filed Jan. 15, 2019, Barkhouse et al.
U.S. Appl. No. 10/203,049, filed Feb. 12, 2019, Kucera et al.
U.S. Appl. No. 10/304,639, filed May 28, 2019, Marumo et al.
U.S. Appl. No. 10/323,846, filed Jun. 18, 2019, Sweet et al.
U.S. Appl. No. 10/390,656, filed Aug. 27, 2019, Gill et al.
U.S. Appl. No. 10/405,697, filed Sep. 10, 2019, Gill et al.
U.S. Appl. No. 10/405,698, filed Sep. 10, 2019, Gill et al.
U.S. Appl. No. 10/413,121, filed Sep. 17, 2019, Gill et al.
U.S. Appl. No. 10/413,122, filed Sep. 17, 2019, Gill et al.
U.S. Appl. No. 10/478,016, filed Nov. 19, 2019, McLemore et al.
U.S. Appl. No. 10/485,378, filed Nov. 26, 2019, Gill et al.
U.S. Appl. No. 10/485,379, filed Nov. 26, 2019, Bennett et al.
U.S. Appl. No. 10/578,309, filed Mar. 3, 2020, Green.
U.S. Appl. No. 10/619,858, filed Apr. 14, 2020, Paller.
U.S. Appl. No. 10/634,347, filed Apr. 28, 2020, Johncock et al.
U.S. Appl. No. 10/646,070, filed May 12, 2020, Gill et al.
U.S. Appl. No. 10/653,270, filed May 19, 2020, Gill et al.
U.S. Appl. No. 10/660,472, filed May 26, 2020, Gill et al.
U.S. Appl. No. 10/660,474, filed May 26, 2020, Gafford.
U.S. Appl. No. 10/674,868, filed Jun. 9, 2020, Gill et al.
U.S. Appl. No. 10/682,011, filed Jun. 16, 2020, Gill et al.
U.S. Appl. No. 10/739,011, filed Aug. 11, 2020, Cowan et al.
U.S. Appl. No. 10/820,750, filed Nov. 3, 2020, Chin et al.
U.S. Appl. No. 10/830,449, filed Nov. 10, 2020, French et al.
U.S. Appl. No. 10/935,250, filed Mar. 2, 2021, Querejeta Andueza et al.
U.S. Appl. No. 11/015,813, filed May 25, 2021, Billman et al.
U.S. Appl. No. 11/035,574, filed Jun. 15, 2021, Delgado et al.
U.S. Appl. No. 11/105,512, filed Aug. 31, 2021, Cowan.
U.S. Appl. No. 11/204,174, filed Dec. 21, 2021, Cowan et al.
U.S. Appl. No. 11/300,298, filed Apr. 12, 2022, French et al.

(56) References Cited

OTHER PUBLICATIONS

U.S. Appl. No. 11/346,552, filed May 31, 2022, Regueiro Fernandez et al.
U.S. Appl. No. 11/415,322, filed Aug. 16, 2022, Jiang et al.
U.S. Appl. No. 11/421,874, filed Aug. 23, 2022, Cowan et al.
International Searching Authority, "International Search Report and Written Opinion", issued in connecton with International Application No. PCT/US2022/038808 mailed Nov. 7, 2022, 9 pages.
International Searching Authority, "International Search Report and Written Opinion", issued in connection with International Application No. PCT/US2022/038807 mailed on Nov. 14, 2022, 11 pages.
International Bureau, "International Preliminary Report on Patentability," issued in connection with International Patent Application No. PCT/US2022/038807, mailed Mar. 21, 2024, 7 pages.
International Bureau, "International Preliminary Report on Patentability," issued in connection with International Patent Application No. PCT/US2022/038808, mailed Mar. 21, 2024, 7 pages.
Australian Government, IP Australia, "Examination Report No. 2," issued in connection with Australian Patent Application No. 2022341150, dated Mar. 26, 2025, 4 pages.
Australian Government, IP Australia, "Examination Report No. 1," issued in connection with Australian Patent Application No. 2022341904, dated Feb. 25, 2025, 4 pages.
European Patent Office, "Extended European Search Report" issued in connection with European Patent Application No. 22867863.7, dated Jan. 3, 2025, 8 pages.
United States Patent & Trademark Office, "Non-Final Office Action" issued in connection with U.S. Appl. No. 17/871,658, dated Feb. 3, 2025, 44 pages.
United States Patent & Trademark Office, "Final Office Action" issued in connection with U.S. Appl. No. 17/871,658, dated Mar. 11, 2025, 25 pages.
Reddit, You can start a rec tec grill remotely. I feel like that's crazy., 8 pages, https://www.reddit.com/r/pelletgrills/comments/c0u2mi/you_can_start_a_rec_tec_grill_remotely_i_feel/?rdt=41002 (Year: 2019).
Australian Government, IP Australia, "Examination Report No. 2," issued in connection with Australian Patent Application No. 2022341904, dated Apr. 17, 2025, 5 pages.

* cited by examiner

METHODS AND APPARATUS FOR AUTOMATING SHUTDOWN PROCESSES OF GAS GRILLS

RELATED APPLICATIONS

This application claims priority to U.S. Provisional Patent Application No. 63/242,901, filed Sep. 10, 2021. The entirety of U.S. Provisional Patent Application No. 63/242,901 is hereby incorporated by reference herein.

FIELD OF THE DISCLOSURE

This disclosure relates generally to gas grills and, more specifically, to methods and apparatus for automating shutdown processes of gas grills.

BACKGROUND

The process of shutting down a conventional gas grill includes a high degree of user (e.g., human) interaction. This is particularly true with regard to multi-burner gas grills. For example, in a conventional gas grill having two burners (e.g., a left burner tube and a right burner tube), the shutdown process typically requires a user to (1) manually push in and rotate a first control knob operatively coupled to a first valve associated with a first one of the two burners, thereby closing off a flow of gas from a manifold of the grill into the first one of the two burners, (2) manually push in and rotate a second control knob operatively coupled to a second valve associated with a second one of the two burners, thereby closing off a flow of gas from the manifold into the second one of the two burners, and (3) manually rotate a knob or lever operatively coupled to a valve of a fuel source (e.g., a valve of a fuel tank or a valve of a natural gas line), thereby closing off a flow of gas from the fuel source into the manifold.

Although relatively simple to perform, the shutdown process for the above-described two-burner conventional gas grill nonetheless involves three separate steps that must be manually performed by a user of the grill according to the specified sequence. In a gas grill having more than two burners (e.g., three burners, four burners, five burners, etc.), the shutdown process becomes even more involved in that the user is required to repeat the above-described second step of the shutdown process for each additional burner of the grill. The shutdown process can accordingly become cumbersome, providing for a user experience that is less than ideal.

Figure 1:
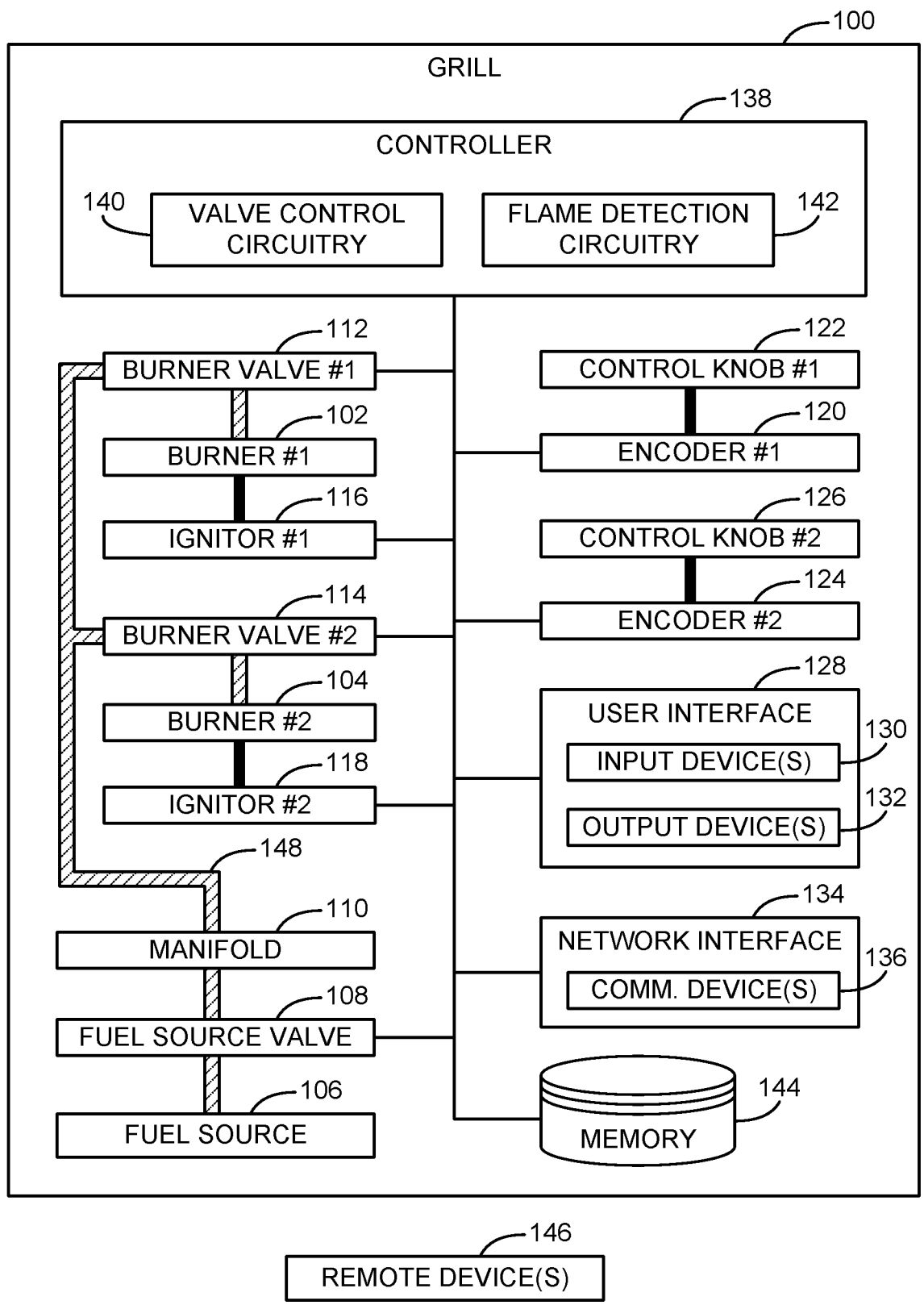
FIG. 1 is a block diagram of an example grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

The process of shutting down a conventional gas grill includes a high degree of user (e.g., human) interaction. This is particularly true with regard to multi-burner gas grills. For example, in a conventional gas grill having two burners (e.g., a left burner tube and a right burner tube), the shutdown process typically begins with a user manually pushing in and then manually rotating a first control knob that is located along a control panel of the grill and operatively coupled to a first valve associated with a first one of the two burners of the grill (e.g., a control knob for the left burner tube). The acts of pushing in and subsequently rotating the first control knob cause the first valve to close, thereby closing off a flow of gas from a manifold of the grill into the first one of the two burners. A second step in the shutdown process typically requires the user to manually push in and then manually rotate a second control knob that is located along the control panel of the grill and operatively coupled to a second valve associated with a second one of the two burners of the grill (e.g., a control knob for the right burner tube). The acts of pushing in and subsequently rotating the second control knob cause the second valve to close, thereby closing off a flow of gas from the manifold into the second one of the two burners.

A third step in the shutdown process typically requires the user to manually rotate a knob of a fuel tank that is operatively coupled to a valve of the fuel tank, with the fuel tank being connected to the manifold of the grill via a conduit. The act of rotating the knob of the fuel tank causes the valve of the fuel tank to close, thereby closing off a flow of gas from the fuel tank, through the conduit, and into the manifold. In some instances, this third step of the shutdown process may additionally require the user to open a door of a cabinet of the grill in order to access the knob of the fuel tank, and to thereafter close the door of the cabinet once the valve of the fuel tank has been closed. In some implementations, the grill may instead be connected to a natural gas line rather than a fuel tank. In such examples, the above-described third step of the shutdown process may instead require the user to manually rotate a knob or a lever that is operatively coupled to a safety valve located in a conduit that connects the natural gas line to the manifold of the grill.

Although relatively simple to perform, the shutdown process for the above-described two-burner conventional gas grill nonetheless involves at least three separate steps that must be manually performed by a user of the grill according to the specified sequence. In a gas grill having more than two burners (e.g., three burners, four burners, five burners, etc.), the shutdown process becomes even more involved in that the user is required to repeat the above-described second step of the shutdown process for each additional burner of the grill. The shutdown process can accordingly become cumbersome, providing for a user experience that is less than ideal.

Relative to the known shutdown processes described above that require a high degree (e.g., a high number) of user (e.g., human) interaction(s) to shutdown multiple (e.g., all) burners of a gas grill, the automated shutdown processes disclosed herein advantageously require a reduced degree (e.g., a reduced number) of user interaction(s) to shutdown multiple (e.g., all) burners of a gas grill. In some examples, automated shutdown processes disclosed herein require as few as two user interactions to shutdown multiple (e.g., all) burners of a gas grill. In other examples, automated shutdown processes disclosed herein require as few as one user interaction to shutdown multiple (e.g., all) burners of a gas grill. Implementing the automated shutdown processes disclosed herein to reduce the degree (e.g., the number) of user interaction(s) required to shutdown multiple (e.g., all) burners of a gas grill advantageously makes the shutdown process less cumbersome in terms of the extent of user involvement that is required in connection with the shutdown process. The automated shutdown processes disclosed herein thereby provide a user experience that is improved relative to that provided by known shutdown processes for gas grills.

The above-identified features as well as other advantageous features of example methods and apparatus for automating shutdown processes of gas grills as disclosed herein are further described below in connection with the figures of the application. As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of a controller configured to perform a specified operation, the controller is arranged, structured, and/or programmed (e.g., based on machine-readable instructions) to perform the specified operation. As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, the term "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

FIG. 1 is a block diagram of an example grill 100 constructed in accordance with the teachings of this disclosure. The grill 100 of FIG. 1 is a gas grill including a plurality of burners. In the illustrated example of FIG. 1, the grill 100 includes an example first burner 102 and an example second burner 104. In other examples, the grill 100 can include one or more other burner(s) (e.g., a third burner, a fourth burner, a fifth burner, etc.) in addition to the first burner 102 and the second burner 104 shown and described in connection with FIG. 1. The first burner 102 and the second burner 104 of FIG. 1 are each constructed as a burner tube (e.g., a linear burner tube) including a gas inlet for receiving a flow of combustible gas, and further including a plurality of apertures configured to emit flames generated in response to ignition of the gas flowing into and/or through the burner tube.

Figure 2:
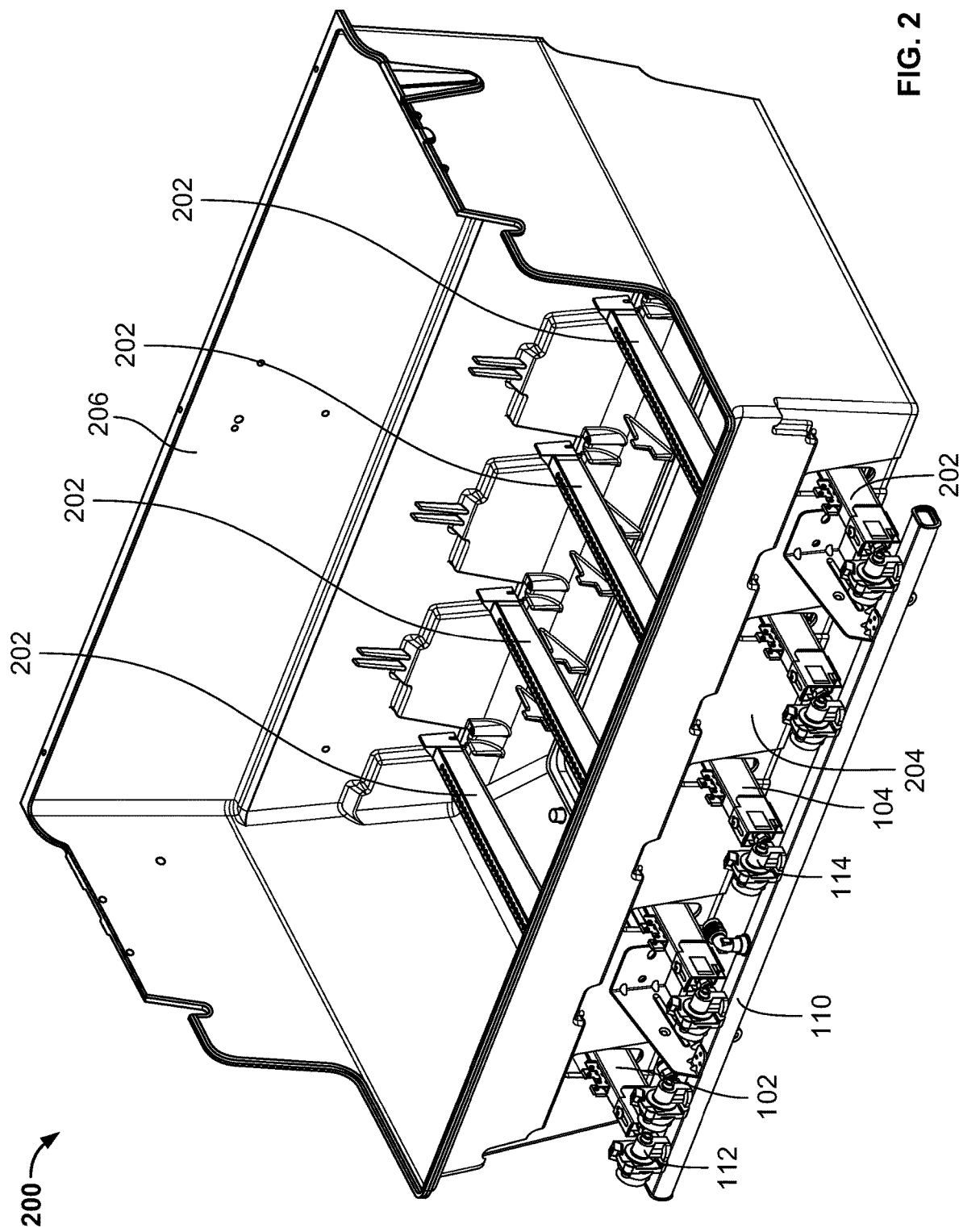
FIG. 2 is a perspective view of an example cookbox constructed in accordance with the teachings of this disclosure.

The grill 100 further includes a cookbox (not shown in FIG. 1) that supports, carries, and/or houses the burners (e.g., the first burner 102 and the second burner 104) of the grill 100, with respective ones of the burners being spaced apart from one another within the cookbox. FIG. 2 is a perspective view of an example cookbox 200 constructed in accordance with the teachings of this disclosure. As shown in FIG. 2, the cookbox 200 supports, carries, and/or houses a total of five example burners 202 (e.g., including the first burner 102 and the second burner 104 of FIG. 1), with each of the five burners 202 being spaced apart from one another within the cookbox 200. In other examples, the cookbox 200 can support, carry, and/or house a different number (e.g., two, three, four, six, etc.) of burners 202. In the illustrated example of FIG. 2, each of the burners 202 is constructed as a linear burner tube positioned in a front-to-rear orientation within the cookbox 200 (e.g., extending from a front wall 204 of the cookbox 200 to a rear wall 206 of the cookbox 200). In other examples, one or more of the burner(s) 202 can have a different shape (e.g., a non-linear shape such as a P-tube), and/or can have a different orientation (e.g., a left-to-right orientation) within the cookbox 200. It should accordingly be understood that the cookbox configuration shown in FIG. 2 is but one example of a cookbox 200 that can be implemented as part of the grill 100 of FIG. 1. The grill 100 of FIG. 1 further includes a frame and/or a cabinet for supporting the cookbox of the grill 100, and a lid for covering and/or enclosing the cookbox of the grill 100. The grill 100 of FIG. 1 further includes one or more side table(s) coupled to the frame, to the cabinet, and/or to the cookbox of the grill 100. Various components of the grill 100 of FIG. 1 described herein can be supported by, carried by, housed by, mounted to, and/or otherwise coupled to at least one of the cookbox, the lid, the frame, the cabinet, or the side table(s) of the grill 100.

In addition to the first burner 102 and the second burner 104 described above, the grill 100 of FIG. 1 further includes an example fuel source 106, an example fuel source valve 108, an example manifold 110, an example first burner valve 112, an example second burner valve 114, an example first ignitor 116, an example second ignitor 118, an example first encoder 120, an example first control knob 122, an example second encoder 124, an example second control knob 126, an example user interface 128 (e.g., including one or more example input device(s) 130 and one or more example output device(s) 132), an example network interface 134 (e.g., including one or more example communication device(s) 136), an example controller 138 (e.g., including example valve control circuitry 140 and example flame detection circuitry 142), and an example memory 144. The grill 100 of FIG. 1 is configured to communicate (e.g., wirelessly communicate) with one or more example remote device(s) 146, as further described below.

The grill 100 of FIG. 1 includes a control system for implementing one or more automated shutdown process(es) that rely on a minimal number of user (e.g., human) interactions with the grill 100 in connection with extinguishing multiple ones (e.g., all) of the burners of grill 100. In the illustrated example of FIG. 1, the control system of the grill 100 includes the fuel source valve 108, the first burner valve 112, the second burner valve 114, the first ignitor 116, the second ignitor 118, the first encoder 120, the second encoder 124, the user interface 128 (e.g., including the input device(s) 130 and the output device(s) 132), the network interface 134 (e.g., including the communication device(s) 136), the controller 138 (e.g., including the valve control circuitry 140 and the flame detection circuitry 142), and the memory 144. In other examples, one or more of the aforementioned components of the grill 100 can be omitted from the control system of the grill 100. For example, the fuel source valve 108 can be omitted from the control system of the grill 100 in instances where the fuel source valve 108 is not configured to be electrically controlled and/or electrically actuated by the controller 138, with the fuel source valve 108 instead being configured only for manual control and/or manual actuation. As another example, the first encoder 120 and the second encoder 124 can be omitted from the control system of the grill 100, with certain functional and/or operational aspects of the first encoder 120 and the second encoder 124 in some instances being alternatively performed by one or more button(s), dial(s), knob(s), switch(es), touchscreen(s), and/or other input device(s) 130 of the user interface 128 of the grill 100. In still other examples, the control system of the grill 100 can further include the remote device(s) 146 that are configured to communicate (e.g., wirelessly communicate) with the grill 100.

The control system of the grill 100 of FIG. 1 is powered and/or operated by a power source. For example, the electrical components that form the control system of the grill 100 can be powered and/or operated by DC power supplied via one or more on-board or connected batteries of the grill 100. As another example, the electrical components that form the control system of the grill 100 can alternatively be powered and/or operated by AC power supplied via household electricity or wall power to which the grill 100 is connected. The grill 100 includes a power button (e.g., a power switch) that is configured to enable (e.g., power on) or disable (e.g., power off) the control system of the grill 100 in response to the power button being manually actuated by a user of the grill 100.

In some examples, one or more component(s) (e.g., the user interface 128, the controller 138, etc.) of the control system of the grill 100 is/are configured to transition from an active (e.g., awake) state to an inactive (e.g., sleep) state while the component(s) and/or, more generally, the control system is/are powered on. In this regard, the inactive (e.g., sleep) state is a low power state in which the control system consumes less power relative to the amount of power consumed by the control system when operating in the active (e.g., awake) state. In some examples, the control system of the grill 100 is configured to automatically transition from the active state to the inactive state in response to the passage of a threshold period of time in which one or more specified component(s) of the control system does/do not receive an input and/or an instruction that is indicative of a user request and/or command. In some examples, the control system of the grill 100 is configured to automatically transition from the inactive state to the active state in response to one or more specified component(s) of the control system receiving an input and/or an instruction that is indicative of a user request and/or command (e.g., a wake request), as further described below.

The grill 100 of FIG. 1 further includes an example gas train 148 that extends from the fuel source 106 to the manifold 110 of the grill 100, and from the manifold 110 to respective ones of the first burner 102 and the second burner 104 of the grill 100. The gas train 148 can be implemented via one ore more conduit(s) (e.g., one or more rigid or flexible pipe(s), tube(s), etc.) that are configured to carry combustible gas from the fuel source 106 to the first burner 102 and/or the second burner 104 of the grill 100. In some examples, the fuel source 106 is implemented as a fuel tank (e.g., a propane tank) containing combustible gas. In such examples, the fuel source 106 will typically be located partially or fully within the cabinet of the grill, partially or fully within a spatial footprint formed by the frame of the grill, below the cookbox of the grill and partially or fully within a spatial footprint formed by the cookbox of the grill, or below the cookbox of the grill and partially or fully within a spatial footprint formed by one of the side tables of the grill. In other examples, the fuel source 106 can instead be implemented as a piped (e.g., household) natural gas line that provides an accessible flow of combustible gas.

The fuel source valve 108 of FIG. 1 is coupled to and operatively positioned within the gas train 148 between the fuel source 106 and the manifold 110 of the grill 100. The fuel source valve 108 is configured to be movable between and an open position that enables gas contained within the fuel source 106 to flow from the fuel source 106 into the manifold 110, and a closed position that prevents gas contained within the fuel source 106 from flowing into the manifold 110. In the illustrated example of FIG. 1, the fuel source valve 108 is operatively coupled to (e.g., in electrical communication with) the controller 138 of the grill 100, with the fuel source valve 108 being implemented as a controllable electric valve (e.g., a solenoid valve) that is configured to transition from the open position to the closed position, and vice-versa, in response to instructions, commands, and/or signals (e.g., a supply of current) generated by the controller 138. In other examples, the fuel source valve 108 can instead be implemented as a valve having a knob or a lever operatively coupled (e.g., mechanically coupled) thereto, with the knob or the lever being configured to be electrically actuated (e.g., via a motor) in response to instructions, commands, and/or signals generated by the controller 138 of the grill 100. In still other examples, the fuel source valve 108 may have no electrically-controllable components, in which case actuation of the fuel source valve 108 from the open position to the closed position, and vice-versa, occurs in response to a user of the grill 100 manually actuating a knob or a lever that is operatively coupled (e.g., mechanically coupled) to the fuel source valve 108.

The first burner valve 112 of FIG. 1 is coupled to and operatively positioned within the gas train 148 between the manifold 110 and the first burner 102 of the grill 100. In some examples, a gas inlet of the first burner valve 112 is located within the manifold 110, and a gas outlet of the first burner valve 112 is located within the first burner 102. The first burner valve 112 is configured to be movable between an open position that enables gas contained within the manifold 110 to flow from the manifold 110 into the first burner 102, and a closed position that prevents gas contained within the manifold 110 from flowing into the first burner 102. In the illustrated example of FIG. 1, the first burner valve 112 is operatively coupled to (e.g., in electrical communication with) the controller 138 of the grill 100, with the first burner valve 112 being is implemented as a controllable electric valve (e.g., a solenoid valve) that is configured to transition from the open position to the closed position, and vice-versa, in response to instructions, commands, and/or signals (e.g., a supply of current) generated by the controller 138. In some examples, the first burner valve 112 is controllable to any position (e.g., infinite position control) between the above-described open position (e.g., fully open) and the above-described closed position (e.g., fully closed). Unlike known burner valves of conventional gas grills, the first burner valve 112 does not include a stem that is mechanically coupled to a user-accessible control knob of the grill, whereby the control knob traditionally facilitates manual control and/or manual actuation of the operable position of the burner valve. The first burner valve 112 of FIG. 1 is accordingly only controllable and/or actuatable via the "control-by-wire" functionality referenced above and further described herein.

The second burner valve 114 of FIG. 1 is coupled to and operatively positioned within the gas train 148 between the manifold 110 and the second burner 104 of the grill 100. In some examples, a gas inlet of the second burner valve 114 is located within the manifold 110, and a gas outlet of the second burner valve 114 is located within the second burner 104. The second burner valve 114 is configured to be movable between an open position that enables gas contained within the manifold 110 to flow from the manifold 110 into the second burner 104, and a closed position that prevents gas contained within the manifold 110 from flowing into the second burner 104. In the illustrated example of FIG. 1, the second burner valve 114 is operatively coupled to (e.g., in electrical communication with) the controller 138 of the grill 100, with the second burner valve 114 being implemented as a controllable electric valve (e.g., a solenoid valve) that is configured to transition from the open position to the closed position, and vice-versa, in response to instructions, commands, and/or signals (e.g., a supply of current) generated by the controller 138. In some examples, the second burner valve 114 is controllable to any position (e.g., infinite position control) between the above-described open position (e.g., fully open) and the above-described closed position (e.g., fully closed). Unlike known burner valves of conventional gas grills, the second burner valve 114 does not include a stem that is mechanically coupled to a user-accessible control knob of the grill, whereby the control knob traditionally facilitates manual control and/or manual actuation of the operable position of the burner valve. The second burner valve 114 of FIG. 1 is accordingly only controllable and/or actuatable via the "control-by-wire" functionality referenced above and further described herein.

The first ignitor 116 of FIG. 1 is mechanically coupled and/or operatively positioned relative to the first burner 102 of the grill 100. More specifically, the first ignitor 116 is located adjacent the first burner 102 at a position that enables the first ignitor 116 to ignite combustible gas as the gas emanates from within the first burner 102 via apertures formed in the first burner 102. The first ignitor 116 of FIG. 1 is operatively coupled to (e.g., in electrical communication with) the controller 138 of the grill 100, with the first ignitor 116 being configured to generate sparks (e.g., via a spark electrode of the first ignitor 116) and/or otherwise induces ignition of the combustible gas in response to an instruction, a command, and/or a signal generated by the controller 138.

The second ignitor 118 of FIG. 1 is mechanically coupled and/or operatively positioned relative to the second burner 104 of the grill 100. More specifically, the second ignitor 118 is located adjacent the second burner 104 at a position that enables the second ignitor 118 to ignite combustible gas as the gas emanates from within the second burner 104 via apertures formed in the second burner 104. The second ignitor 118 of FIG. 1 is operatively coupled to (e.g., in electrical communication with) the controller 138 of the grill 100, with the second ignitor 118 being configured to generate sparks (e.g., via a spark electrode of the second ignitor 118) and/or otherwise induces ignition of the combustible gas in response to an instruction, a command, and/or a signal generated by the controller 138.

In some examples, the first ignitor 116 and/or the second ignitor 118 of FIG. 1 can respectively be structured, configured, and/or implemented as one of the various ignitors described in U.S. patent application Ser. No. 17/144,038, filed on Jan. 7, 2021. In such examples, the first ignitor 116 and/or the second ignitor 118 of FIG. 1 can respectively be mechanically coupled to a corresponding one of the first burner 102 and/or the second burner 104 of the grill 100 via a ceramic harness as described in U.S. patent application Ser. No. 17/144,038. The entirety of U.S. patent application Ser. No. 17/144,038 is hereby incorporated by reference herein.

The first encoder 120 of FIG. 1 is mechanically coupled to the first control knob 122 of FIG. 1 and operatively coupled to (e.g., in electrical communication with) the controller 138 of FIG. 1. In this regard, the first encoder 120 of FIG. 1 is implemented as a rotary encoder having a rotatable shaft to which the first control knob 122 is mechanically coupled. The rotatable shaft of the first encoder 120 can be rotated relative to a fixed portion of the first encoder 120 via user interaction with the first control knob 122 (e.g., manual rotation of the first control knob 122). The fixed portion of the first encoder 120 includes one or more sensor(s) that is/are configured to sense, measure, and/or detect the relative angular position of the rotatable shaft and/or the relative angular position of the first control knob 122. Data, information, and/or signals that is/are sensed, measured, and/or detected by the sensor(s) of the first encoder 120 can be transmitted directly to the controller 138 of FIG. 1, and/or can be transmitted to and stored in the memory 144 of FIG. 1. In some examples, the sensor(s) of the first encoder 120 is/are further configured to sense, measure, and/or detect a translational movement of the rotatable shaft relative to the fixed portion of the first encoder 120, as may occur in response to a user of the grill 100 pushing or pressing on the first control knob 122 in a direction that is generally perpendicular to the direction(s) in which the first control knob 122 is configured to be rotated by the user.

In some examples, the first encoder 120 of FIG. 1 is mounted to a control panel of the grill 100 (e.g., located along the front wall 204 of the cookbox 200 of the grill 100) such that the first encoder 120 is located at a position on the control panel that would conventionally be occupied by a stem of a burner valve that corresponds to the first burner valve 112 of FIG. 1. Such an example further facilitates locating the first control knob 122 of FIG. 1 at a position on or along the control panel that would conventionally be occupied by a control knob that is mechanically coupled to the stem of the burner valve that corresponds to the first burner valve 112 of FIG. 1. While the first control knob 122 of FIG. 1 may accordingly be located at a position on or along the control panel of the grill 100 that mimics the position at which a traditional control knob is located, user actuation (e.g., manual rotation) of the first control knob 122 of FIG. 1 provides a response that differs greatly from that provided by user actuation (e.g., manual rotation) of a traditional control knob.

For example, conventional multi-burner gas grills typically include a plurality of control knobs (e.g., located on or along a control panel of the grill), with each control knob being physically associated with a corresponding one of the burners of the gas grill by virtue of (1) a first mechanical connection existing between the control knob and a stem of a corresponding burner valve (e.g., such that rotation of the control knob by a user of the grill opens, closes, or otherwise adjusts the position of the burner valve), and (2) a second mechanical connection existing between the burner valve and the corresponding burner. By contrast, the grill 100 of FIG. 1 implements a "control-by-wire" architecture that eliminates the first of the aforementioned mechanical connections in favor of (1) a mechanical connection existing between the first control knob 122 of FIG. 1 and the first encoder 120 of FIG. 1, (2) a first electrical connection existing between the first encoder 120 of FIG. 1 and the controller 138 and/or the memory 144 of FIG. 1, and (3) a second electrical connection existing between the controller 138 of FIG. 1 and the first burner valve 112 of FIG. 1.

Although the first control knob 122 of FIG. 1 is not mechanically coupled to the first burner valve 112 of FIG. 1, rotation of the first control knob 122 by a user of the grill 100 can nonetheless cause the first burner valve 112 to open, close, or otherwise adjust its position. In this regard, the controller 138 of FIG. 1 is configured to interpret different rotational positions of the first control knob 122 of FIG. 1 (e.g., as sensed, measured, and/or detected by the first encoder 120 of FIG. 1) as being indicative of correlated user requests associated with different operational states (e.g., ignite, high, medium, low, or off) of the first burner 102 of FIG. 1. For example, in response to determining that the first control knob 122 has been positioned at a relative angle of negative one hundred eighty degrees)(−180°, the controller 138 may interpret the determined rotational position as a user request that the first burner 102 operate in a "medium" state. To satisfy the user request indicated by the determined rotational position of the first control knob 122, the controller 138 may instruct, command, and/or signal the first burner valve 112 of FIG. 1 to assume a partially open (e.g., 50% open) position that facilitates a "medium" flow of gas through the first burner valve 112 and into the first burner 102, thereby effecting the "medium" operational state of the first burner 102.

As another example, in response to determining that the first control knob 122 has been positioned at a relative angle of negative ninety degrees)(−90°, the controller 138 may interpret the determined rotational position as a user request that the first burner 102 operate in a "high" state. To satisfy the user request indicated by the determined rotational position of the first control knob 122, the controller 138 may instruct, command, and/or signal the first burner valve 112 of FIG. 1 to assume a fully open (e.g., 100% open) position that facilitates a "high" flow of gas through the first burner valve 112 and into the first burner 102, thereby effecting the "high" operational state of the first burner 102. As yet another example, in response to determining that the first control knob 122 has been positioned at a relative angle of zero degrees (0°), the controller 138 may interpret the determined rotational position as a user request that the first burner 102 be placed in an "off" state. To satisfy the user request indicated by the determined rotational position of the first control knob 122, the controller 138 may instruct, command, and/or signal the first burner valve 112 of FIG. 1 to assume a fully closed (e.g., 0% open, or 100% closed) position that prevents any flow of gas through the first burner valve 112 and into the first burner 102, thereby effecting the "off" state of the first burner 102.

The second encoder 124 of FIG. 1 is mechanically coupled to the second control knob 126 of FIG. 1 and operatively coupled to (e.g., in electrical communication with) the controller 138 of FIG. 1. In this regard, the second encoder 124 of FIG. 1 is implemented as a rotary encoder having a rotatable shaft to which the second control knob 126 is mechanically coupled. The rotatable shaft of the second encoder 124 can be rotated relative to a fixed portion of the second encoder 124 via user interaction with the second control knob 126 (e.g., manual rotation of the second control knob 126). The fixed portion of the second encoder 124 includes one or more sensor(s) that is/are configured to sense, measure, and/or detect the relative angular position of the rotatable shaft and/or the relative angular position of the second control knob 126. Data, information, and/or signals that is/are sensed, measured, and/or detected by the sensor(s) of the second encoder 124 can be transmitted directly to the controller 138 of FIG. 1, and/or can be transmitted to and stored in the memory 144 of FIG. 1. In some examples, the sensor(s) of the second encoder 124 is/are further configured to sense, measure, and/or detect a translational movement of the rotatable shaft relative to the fixed portion of the second encoder 124, as may occur in response to a user of the grill 100 pushing or pressing on the second control knob 126 in a direction that is generally perpendicular to the direction(s) in which the second control knob 126 is configured to be rotated by the user.

In some examples, the second encoder 124 of FIG. 1 is mounted to a control panel of the grill 100 (e.g., located along the front wall 204 of the cookbox 200 of the grill 100) such that the second encoder 124 is located at a position on the control panel that would conventionally be occupied by a stem of a burner valve that corresponds to the second burner valve 114 of FIG. 1. Such an example further facilitates locating the second control knob 126 of FIG. 1 at a position on or along the control panel that would conventionally be occupied by a control knob that is mechanically coupled to the stem of the burner valve that corresponds to the second burner valve 114 of FIG. 1. While the second control knob 126 of FIG. 1 may accordingly be located at a position on or along the control panel of the grill 100 that mimics the position at which a traditional control knob is located, user actuation (e.g., manual rotation) of the second control knob 126 of FIG. 1 provides a response that differs greatly from that provided by user actuation (e.g., manual rotation) of a traditional control knob.

For example, conventional multi-burner gas grills typically include a plurality of control knobs (e.g., located on or along a control panel of the grill), with each control knob being physically associated with a corresponding one of the burners of the gas grill by virtue of (1) a first mechanical connection existing between the control knob and a stem of a corresponding burner valve (e.g., such that rotation of the control knob by a user of the grill opens, closes, or otherwise adjusts the position of the burner valve), and (2) a second mechanical connection existing between the burner valve and the corresponding burner. By contrast, the grill 100 of FIG. 1 implements a "control-by-wire" architecture that eliminates the first of the aforementioned mechanical connections in favor of (1) a mechanical connection existing between the second control knob 126 of FIG. 1 and the second encoder 124 of FIG. 1, (2) a first electrical connection existing between the second encoder 124 of FIG. 1 and the controller 138 and/or the memory 144 of FIG. 1, and (3) a second electrical connection existing between the controller 138 of FIG. 1 and the second burner valve 114 of FIG. 1.

Although the second control knob 126 of FIG. 1 is not mechanically coupled to the second burner valve 114 of FIG. 1, rotation of the second control knob 126 by a user of the grill 100 can nonetheless cause the second burner valve 114 to open, close, or otherwise adjust its position. In this regard, the controller 138 of FIG. 1 is configured to interpret different rotational positions of the second control knob 126 of FIG. 1 (e.g., as sensed, measured, and/or detected by the second encoder 124 of FIG. 1) as being indicative of correlated user requests associated with different operational states (e.g., ignite, high, medium, low, or off) of the second burner 104 of FIG. 1. For example, in response to determining that the second control knob 126 has been positioned at a relative angle of negative one hundred eighty degrees) (−180°), the controller 138 may interpret the determined rotational position as a user request that the second burner 104 operate in a "medium" state. To satisfy the user request indicated by the determined rotational position of the second control knob 126, the controller 138 may instruct, command, and/or signal the second burner valve 114 of FIG. 1 to assume a partially open (e.g., 50% open) position that facilitates a "medium" flow of gas through the second burner valve 114 and into the second burner 104, thereby effecting the "medium" operational state of the second burner 104.

As another example, in response to determining that the second control knob 126 has been positioned at a relative angle of negative ninety degrees)(−90°, the controller 138 may interpret the determined rotational position as a user request that the second burner 104 operate in a "high" state. To satisfy the user request indicated by the determined rotational position of the second control knob 126, the controller 138 may instruct, command, and/or signal the second burner valve 114 of FIG. 1 to assume a fully open (e.g., 100% open) position that facilitates a "high" flow of gas through the second burner valve 114 and into the second burner 104, thereby effecting the "high" operational state of the second burner 104. As yet another example, in response to determining that the second control knob 126 has been positioned at a relative angle of zero degrees (0°), the controller 138 may interpret the determined rotational position as a user request that the second burner 104 be placed in an "off" state. To satisfy the user request indicated by the determined rotational position of the second control knob 126, the controller 138 may instruct, command, and/or signal the second burner valve 114 of FIG. 1 to assume a fully closed (e.g., 0% open, or 100% closed) position that prevents any flow of gas through the second burner valve 114 and into the second burner 104, thereby effecting the "off" state of the second burner 104.

The user interface 128 of FIG. 1 includes one or more input device(s) 130 (e.g., buttons, dials, knobs, switches, touchscreens, etc.) and/or one or more output device(s) 132 (e.g., liquid crystal displays, light emitting diodes, speakers, etc.) that enable a user of the grill 100 to interact with the above-described control system of the grill 100. In the illustrated example of FIG. 1, the user interface 128 is operatively coupled to (e.g., in electrical communication with) the controller 138 and/or the memory 144 of the grill 100. In some examples, the user interface 128 is mechanically coupled to (e.g., fixedly connected to) the grill 100. For example, the user interface 128 can be mounted to the frame, to the cabinet, to one of the side tables, or even to the cookbox or a lid of the grill 100. The user interface 128 is preferably mounted to a portion of the grill 100 that is readily accessible to a user of the grill 100, such as a front portion of the frame, a front portion of the cabinet, a front portion of one of the side tables, a front portion of the cookbox, or a front portion of the lid of the grill 100. In some examples, respective ones of the input device(s) 130 and/or the output device(s) 132 of the user interface 128 can be mounted to different portions of the grill 100. For example, a first one of the input device(s) 130 can be mounted to either a rear portion or a side portion of either the frame, the cabinet, one of the side tables, the cookbox, or the lid of the grill 100, and a second one of the input device(s) 130 can be mounted to a front portion of either the frame, the cabinet, one of the side tables, the cookbox, or the lid of the grill 100. As another example, a first one of the input device(s) 130 can be mounted to a portion of the control panel of the grill 100 that might otherwise be occupied either by the first encoder 120 and/or the first control knob 122 of the grill 100, or by a conventional control knob that is mechanically coupled to a conventional burner valve operatively coupled to the first burner 102 of the grill 100, and a second one of the input device(s) 130 can be mounted to a portion of the control panel of the grill 100 that might otherwise be occupied either by the second encoder 124 and/or the second control knob 126 of the grill 100, or by a conventional control knob that is mechanically coupled to a conventional burner valve operatively coupled to the second burner 104 of the grill 100. The architecture and/or operations of the user interface 128 can be distributed among any number of user interfaces respectively having any number of input device(s) 130 and/or output device(s) 132 located at and/or mounted to any portion of the grill 100.

Figure 3:
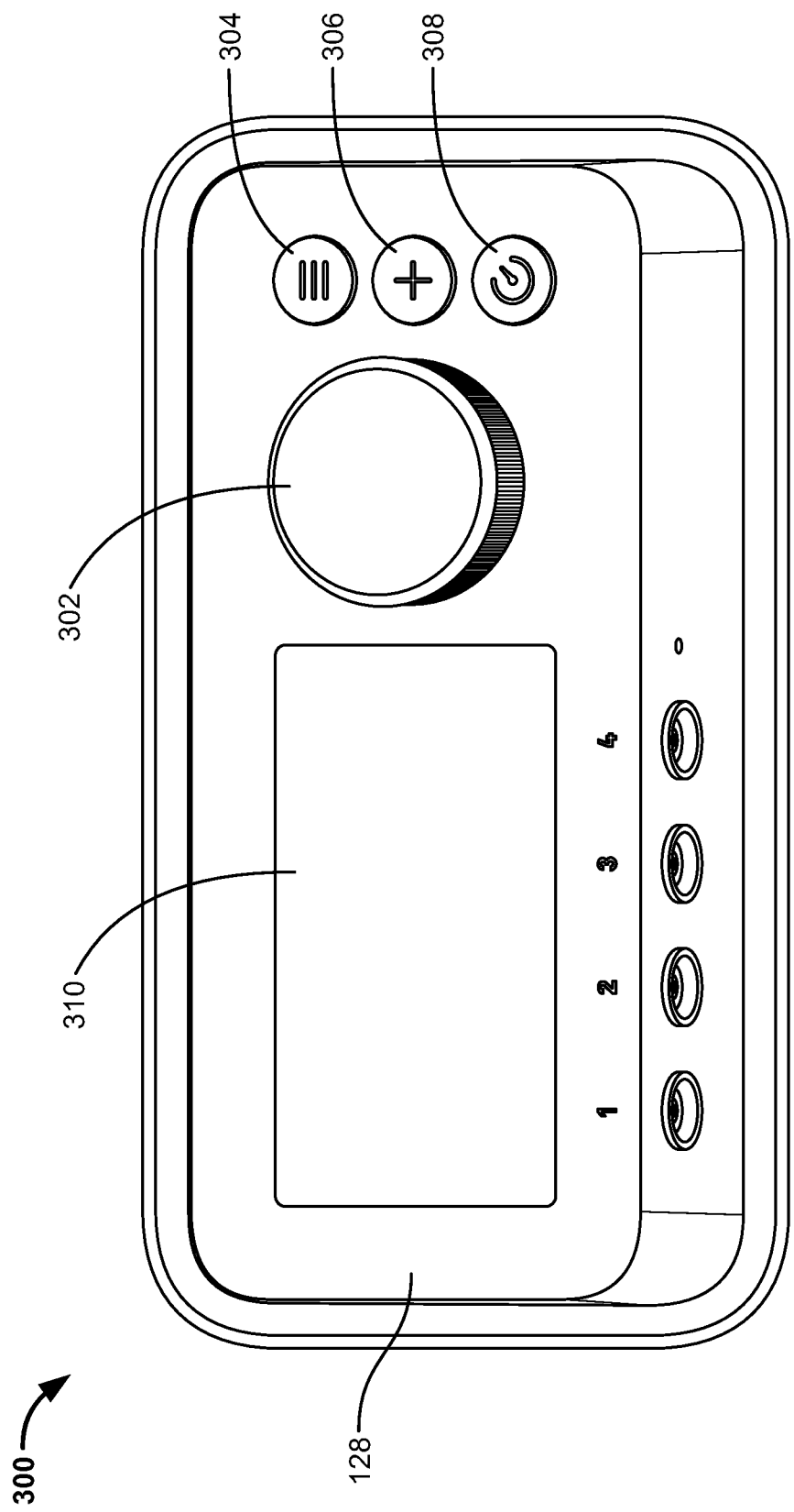
FIG. 3 is a front view of an example user interface constructed in accordance with the teachings of this disclosure.

FIG. 3 is a front view of an example implementation 300 of the user interface 128 of the grill 100 of FIG. 1. As shown in FIG. 3, the input device(s) 130 of the user interface 128 include an example dial 302, an example first button 304, an example second button 306, and an example third button 308, and the output device(s) 132 of the user interface 128 include an example display 310. In the illustrated example of FIG. 3, the dial 302 of the user interface 128 is a selection dial that can be rotated by a user of the grill 100 to adjust temperatures of the grill 100, and/or to navigate through options presented on the display 310 of the user interface 128. In addition to being rotatable, the dial 302 can also be pushed by a user of the grill 100 to make and/or confirm a selection of one of the options presented on the display 310. The first button 304 of the user interface 128 is a menu button that can be pressed by a user of the grill 100 to access a main menu (e.g., a "home" menu) of selectable options, and to cause the main menu to be presented on the display 310 of the user interface 128. The second button 306 of the user interface 128 is a cook program button that can be pressed by a user of the grill 100 to access selectable cooking programs, and to cause cooking steps associated with the selectable cooking programs to be presented on the display 310 of the user interface 128. The third button 308 of the user interface 128 is a timer button that can be pressed by a user of the grill 100 to initiate a timer, and to cause the running time associated with the timer to be presented on the display 310 of the user interface 128. The display 310 of the user interface 128 is a liquid crystal display configured to present textual and/or graphical information to a user of the grill 100. In some examples, the display 310 can be implemented as a touch screen, in which case the display 310 serves not only as one of the output device(s) 132 of the user interface 128, but also as another one of the input device(s) 130 of the user interface 128.

In some examples, one or more user input(s), selection(s), instruction(s), command(s) and/or interaction(s) can be received via the dial 302, the first button 304, the second button 306, the third button 308, or the display 310 of the user interface 128 in connection with the automated shutdown processes described herein. For example, one or more user input(s), selection(s), instruction(s), command(s) and/or interaction(s) received via the dial 302, the first button 304, the second button 306, the third button 308, or the display 310 of the user interface 128 may be indicative of a user-based shutdown request associated with the first burner 102 and/or the second burner 104 of the grill 100 and/or, more generally, associated with an automated shutdown process of the grill 100. As another example, one or more user input(s), selection(s), instruction(s), command(s) and/or interaction(s) received via the dial 302, the first button 304, the second button 306, the third button 308, or the display 310 of the user interface 128 may be indicative of a user-based wake request associated with the control system (e.g., the user interface 128, the controller 138, etc.) of the grill 100 and/or, more generally, associated with an automated shutdown process of the grill 100. As another example, one or more user input(s), selection(s), instruction(s), command(s) and/or interaction(s) received via the dial 302, the first button 304, the second button 306, the third button 308, or the display 310 of the user interface 128 may be indicative of a user-based shutdown confirmation input associated with a shutdown confirmation request and/or, more generally, associated with an automated shutdown process of the grill 100.

In some examples, one or more text-based or graphic-based notification(s) or message(s) can be presented via the display 310 of the user interface 128 in connection with the automated shutdown processes described herein. For example, one or more text-based or graphic-based notification(s) or message(s) presented via the display 310 of the user interface 128 may inform the user of the grill 100 that a user-based shutdown request has been received. As another example, one or more text-based or graphic-based notification(s) or message(s) presented via the display 310 of the user interface 128 may inform the user of the grill 100 that a user-based wake request has been received. As another example, one or more text-based or graphic-based notification(s) or message(s) presented via the display 310 of the user interface 128 may inform the user of the grill 100 that the control system of the grill is in either an active (e.g., awake) state or an inactive (e.g., sleep) state. As another example, one or more text-based or graphic-based notification(s) or message(s) presented via the display 310 of the user interface 128 may inform the user of the grill 100 that a user-based shutdown confirmation input associated with a shutdown confirmation request has been received. As another example, one or more text-based or graphic-based notification(s) or message(s) presented via the display 310 of the user interface 128 may inform the user of the grill 100 that one or more burner(s) (e.g., the first burner 102 and/or the second burner 104) of the grill 100 has/have been extinguished in connection with an automated shutdown process. As another example, one or more text-based or graphic-based notification(s) or message(s) presented via the display 310 of the user interface 128 may inform the user of the grill 100 that one or more burner(s) (e.g., the first burner 102 and/or the second burner 104) of the grill 100 has/have not been extinguished in connection with an automated shutdown process.

The network interface 134 of FIG. 1 includes one or more communication device(s) 136 (e.g., transmitter(s), receiver(s), transceiver(s), modem(s), gateway(s), wireless access point(s), etc.) to facilitate exchange of data with external machines (e.g., computing devices of any kind, including the remote device(s) 146 of FIG. 1) by a wired or wireless communication network. Communications transmitted and/or received via the communication device(s) 136 and/or, more generally, via the network interface 134 can be made over and/or carried by, for example, an Ethernet connection, a digital subscriber line (DSL) connection, a telephone line connection, a coaxial cable system, a satellite system, a wireless system, a cellular telephone system, an optical connection, etc. The network interface 134 enables a user of the grill 100 to remotely interact (e.g., via one or more of the remote device(s) 146) with the above-described control system of the grill 100. In the illustrated example of FIG. 1, the network interface 134 is operatively coupled to (e.g., in electrical communication with) the controller 138 and/or the memory 144 of the grill 100.

The remote device(s) 146 of FIG. 1 can be implemented by any type(s) and/or any number(s) of mobile or stationary computing devices. In this regard, examples of such remote device(s) 146 include a smartphone, a tablet, a laptop, a desktop, a cloud server, a wearable computing device, etc. The remote device(s) 146 of FIG. 1 facilitate a remote (e.g., wired, or wireless) extension of the above-described user interface 128 of the grill 100. In this regard, each remote device 146 includes one or more input device(s) and/or one or more output device(s) that mimic and/or enable a remotely-located version of the above-described functionality of the corresponding input device(s) 130 and/or the corresponding output device(s) 132 of the user interface 128 of the grill 100. Accordingly, one or more user input(s), selection(s), instruction(s), command(s) and/or interaction(s) generated via the input device(s) of the remote device(s) 146 can be received at the grill 100 (e.g., via the communication device(s) 136 of the network interface 134 of the grill 100) in connection with the automated shutdown processes described herein. In this same regard, one or more text-based or graphic-based notification(s) or message(s) transmitted from the grill 100 (e.g., via the communication device(s) 136 of the network interface 134 of the grill 100) can be presented via the output device(s) of the remote device(s) 146 in connection with the automated shutdown processes described herein.

The controller 138 of FIG. 1 manages and/or controls the control system of the grill 100 and/or the components thereof. In the illustrated example of FIG. 1, the controller 138 is operatively coupled to (e.g., in electrical communication with) the fuel source valve 108, the first burner valve 112, the second burner valve 114, the first ignitor 116, the second ignitor 118, the first encoder 120, the second encoder 124, the user interface 128 (e.g., including the input device(s) 130 and the output device(s) 132), the network interface 134 (e.g., including the communication device(s) 136), and/or the memory 144 of the grill 100 of FIG. 1. The controller 138 of FIG. 1 is also operatively coupled to (e.g., in wired or wireless electrical communication with) the remote device(s) 146 of FIG. 1 via the network interface 134 (e.g., including the communication device(s) 136) of the grill 100 of FIG. 1. In the illustrated example of FIG. 1, the controller 138 includes the valve control circuitry 140 and the flame detection circuitry 142 of FIG. 1, each of which is discussed in further detail herein. The valve control circuitry 140, the flame detection circuitry 142, and/or, more generally, the controller 138 of FIG. 1 can individually and/or collectively be implemented by any type(s) and/or any number(s) of semiconductor device(s) (e.g., processor(s), microprocessor(s), microcontroller(s), etc.) and/or circuit(s).

In the illustrated example of FIG. 1, the controller 138 is graphically represented as a single, discrete structure that manages and/or controls the operation(s) of various components of the control system of the grill 100. It is to be understood, however, that in other examples, the architecture and/or operations of the controller 138 can be distributed among any number of controllers, with each separate controller having a dedicated subset of one or more operation(s) associated with the automated shutdown processes described herein. As but one example, the controller 138 of FIG. 1 can be separated into two distinct controllers, whereby a first one of the two controllers includes the valve control circuitry 140 of the controller 138, and a second one of the two controllers includes the flame detection circuitry 142 of the controller 138. In some examples, the grill 100 can further include separate, distinct controllers for one or more of the fuel source valve 108, the first burner valve 112, the second burner valve 114, the first encoder 120, the second encoder 124, the user interface 128, and/or the network interface 134 of the control system of the grill 100.

The controller 138 of FIG. 1 manages and/or controls one or more automated shutdown process(es) described herein. In some examples, the controller 138 initiates an automated shutdown process in response to the controller 138 determining that a request to shut down the grill 100 of FIG. 1 (referred to herein with reference to FIG. 1 as a "shutdown request") has been received. For example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1. As another example, the controller 138 may determine that a shutdown request has been received based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1. As yet another example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1. In some examples, the controller 138 immediately implements one or more step(s) of an automated shutdown process in response to determining that the shutdown request has been received at the grill 100. In other examples, the controller 138 implement(s) one or more step(s) of an automated shutdown process in a delayed manner in response to determining that the shutdown request has been received at the grill 100, with the associated implementation delay(s) being based on a shutdown schedule and/or a shutdown time indicated by the shutdown request.

In some examples, the controller 138 of FIG. 1 determines whether a request to wake the control system of the grill 100 of FIG. 1 (referred to herein with reference to FIG. 1 as a "wake request") has been received. For example, the controller 138 may determine that a wake request has been received based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1. As another example, the controller 138 may determine that a wake request has been received based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1. As yet another example, the controller 138 may determine that a wake request has been received based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1.

In some examples, the controller 138 of FIG. 1 instructs, commands, signals, and/or otherwise causes the control system of the grill 100 of FIG. 1 to wake in response to the controller 138 determining that a wake request has been received. For example, the controller 138 may instruct, command, signal, and/or otherwise cause the control system of the grill 100 to transition from an inactive (e.g., sleep) state to an active (e.g., awake) state in response to the controller 138 determining that a wake request has been received. In some examples, the controller 138 of FIG. 1 recognizes, responds to, and/or otherwise acts upon a shutdown request that has been received at the grill 100 of FIG. 1 only when the controller 138 first determines that the shutdown request was received at the grill 100 at a time when the control system of the grill 100 is/was awake. In instances where the controller 138 determines that the shutdown request was received at the grill 100 at a time when the control system of the grill 100 is/was not awake, the controller 138 declines to recognize, respond to, and/or otherwise act on the shutdown request, and instead waits for a wake request to be received at the grill 100. In still other examples, the controller 138 can instead recognize, respond to, and/or otherwise act on a shutdown request that has been received at the grill 100 of FIG. 1 even if the controller 138 determines that the startup request was received at the grill 100 at a time when the control system of the grill 100 is/was in an inactive (e.g., sleep) state.

In some examples, the controller 138 of FIG. 1 instructs, commands, signals, and/or otherwise causes the user interface 128 of the grill 100 of FIG. 1 to present a request for a user-based shutdown confirmation input (referred to herein with reference to FIG. 1 as a "shutdown confirmation request"). In some examples, the controller 138 of FIG. 1 additionally or alternatively causes the network interface 134 of the grill 100 to transmit the shutdown confirmation request to one or more of the remote device(s) 146 of FIG. 1. In some examples, the shutdown confirmation request transmitted via the network interface 134 may be the same as, or may mimic the shutdown confirmation request presented via the user interface 128. In some examples, the controller 138 initiates a timer in association with the shutdown confirmation request, whereby the timer provides and/or imposes a time frame, a time period, and/or a time limit by which a response to the shutdown confirmation request must be made and/or received at the grill 100.

In some examples, the controller 138 of FIG. 1 determines whether a shutdown confirmation input has been received at the grill 100 of FIG. 1 before the timer associated with the shutdown confirmation request times out. For example, the controller 138 may determine that a shutdown confirmation input has been received before the timer associated with the shutdown confirmation request times out based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1 occurring before the timer associated with the shutdown confirmation request times out. As another example, the controller 138 may determine that a shutdown confirmation input has been received before the timer associated with the shutdown confirmation request times out based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1 before the timer associated with the shutdown confirmation request times out. As yet another example, the controller 138 may determine that a shutdown confirmation input has been received before the timer associated with the shutdown confirmation request times out based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1 before the timer associated with the shutdown confirmation request times out. In some examples, the controller 138 of FIG. 1 recognizes, responds to, and/or otherwise acts upon a shutdown request that has been received at the grill 100 of FIG. 1 only when the controller 138 first determines that the shutdown confirmation input was received at the grill 100 of FIG. 1 before the timer associated with the shutdown confirmation request times out. In instances where the controller 138 determines that the shutdown confirmation input was not received at the grill 100 of FIG. 1 before the timer associated with the shutdown confirmation request times out, the controller 138 declines to recognize, respond to, and/or otherwise act on the shutdown request, and instead waits for another shutdown request to be received at the grill 100.

The valve control circuitry 140 of the controller 138 of FIG. 1 manages and/or controls one or more operation(s) of the first burner valve 112 and/or the second burner valve 114 of the grill 100 of FIG. 1 in association with one or more automated shutdown process(es) described herein. In some examples, the valve control circuitry 140 of the controller 138 instructs, commands, signals, and/or otherwise causes multiple ones (e.g., all) of the burner valves (e.g., the first burner valve 112 and the second burner valve 114) of the grill 100 of FIG. 1 to close. For example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to concurrently close (e.g., the first burner valve 112 and the second burner valve 114 closing at substantially the same time). As another example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to sequentially close (e.g., the first burner valve 112 closing at a first time, followed by the second burner valve 114 closing at a second time subsequent to the first time). In some examples, the valve control circuitry 140 of the controller 138 of FIG. 1 also manages and/or controls one or more operation(s) of the fuel source valve 108 of the grill 100 of FIG. 1 in association with one or more automated shutdown process(es) described herein. For example, the valve control circuitry 140 of the controller 138 can instruct, command, signal, and/or otherwise cause the fuel source valve 108 to close.

The flame detection circuitry 142 of the controller 138 of FIG. 1 senses and/or detects whether the first burner 102 and/or the second burner 104 of the grill 100 of FIG. 1 is/are extinguished (e.g., not ignited). In some examples, the controller 138 relies on the flame detection circuitry 142 in connection with the controller 138 determining whether one or more operation(s) associated with an automated shutdown process was/were successfully performed (e.g., whether the first burner 102 and/or the second burner 104 was/were successfully extinguished). For example, if the flame detection circuitry 142 of the controller 138 indicates that the first burner 102 and the second burner 104 of the grill 100 have been extinguished in connection with an automated shutdown process, the controller 138 can accordingly determine that one or more valve control operation(s) (e.g., controlled by the valve control circuitry 140 of the controller 138) associated with the automated shutdown process were successfully performed. Conversely, if the flame detection circuitry 142 of the controller 138 indicates that the first burner 102 and/or the second burner 104 of the grill 100 has/have not been extinguished in connection with the automated shutdown process, the controller 138 can accordingly determine that one or more valve control operation(s) (e.g., controlled by the valve control circuitry 140 of the controller 138) associated with the automated shutdown process were not successfully performed.

The flame detection circuitry 142 of the controller 138 of FIG. 1 can accordingly be utilized as a diagnostic tool with regard to determining and/or addressing the success and/or failure of any automated shutdown process described herein. In some examples, an indication from the flame detection circuitry 142 that one or more operation(s) associated with an automated shutdown process has/have failed may cause the controller 138 to re-instruct, re-command, and/or re-signal one or more component(s) of the control system of the grill 100 to repeat one or more previously-instructed, previously-commanded, and/or previously-signaled operation(s) associated with the automated shutdown process. The flame detection circuitry 142 of the controller of FIG. 1 can be structured, configured, and/or implemented as described in U.S. patent application Ser. No. 17/144,038, filed on Jan. 7, 2021. The entirety of U.S. patent application Ser. No. 17/144,038 is hereby incorporated by reference herein.

The memory 144 of FIG. 1 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 144 of FIG. 1 can be stored in any file and/or data structure format, organization scheme, and/or arrangement.

The memory 144 stores data sensed, measured, detected, generated, input, output, transmitted, and/or received by, to, and/or from the fuel source valve 108, the first burner valve 112, the second burner valve 114, the first ignitor 116, the second ignitor 118, the first encoder 120, the second encoder 124, the user interface 128 (e.g., including the input device(s) 130 and the output device(s) 132), the network interface 134 (e.g., including the communication device(s) 136), the controller 138 (e.g., including the valve control circuitry 140 and the flame detection circuitry 142), the remote device(s) 146, and/or, more generally, the control system of the grill 100 of FIG. 1. The memory 144 also stores instructions (e.g., machine-readable instructions) and associated data corresponding to the processes, protocols, sequences and/or methods described below in connection with FIGS. 4-7. The memory 144 of FIG. 1 is accessible to one or more of the fuel source valve 108, the first burner valve 112, the second burner valve 114, the first encoder 120, the second encoder 124, the user interface 128 (e.g., including the input device(s) 130 and the output device(s) 132), the network interface 134 (e.g., including the communication device(s) 136), the controller 138 (e.g., including the valve control circuitry 140 and the flame detection circuitry 142), the remote device(s) 146, and/or, more generally, the control system of the grill 100 of FIG. 1.

While an example manner of implementing the control system of the grill 100 is illustrated in FIG. 1, one or more of the elements, processes, and/or devices illustrated in FIG. 1 may be combined, divided, re-arranged, omitted, eliminated, and/or implemented in any other way. Further, the example fuel source valve 108, the example first burner valve 112, the example second burner valve 114, the example first ignitor 116, the example second ignitor 118, the example first encoder 120, the example second encoder 124, the example user interface 128 (e.g., including the example input device(s) 130 and the example output device(s) 132), the example network interface 134 (e.g., including the example communication device(s) 136), the example controller 138 (e.g., including the example valve control circuitry 140 and the example flame detection circuitry 142), the example memory 144, and/or, more generally, the control system of the grill 100 of FIG. 1, may be implemented by hardware, software, firmware, and/or any combination of hardware, software, and/or firmware. Thus, for example, any of the example fuel source valve 108, the example first burner valve 112, the example second burner valve 114, the example first ignitor 116, the example second ignitor 118, the example first encoder 120, the example second encoder 124, the example user interface 128 (e.g., including the example input device(s) 130 and the example output device(s) 132), the example network interface 134 (e.g., including the example communication device(s) 136), the example controller 138 (e.g., including the example valve control circuitry 140 and the example flame detection circuitry 142), the example memory 144, and/or, more generally, the control system of the grill 100 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example fuel source valve 108, the example first burner valve 112, the example second burner valve 114, the example first ignitor 116, the example second ignitor 118, the example first encoder 120, the example second encoder 124, the example user interface 128 (e.g., including the example input device(s) 130 and the example output device(s) 132), the example network interface 134 (e.g., including the example communication device(s) 136), the example controller 138 (e.g., including the example valve control circuitry 140 and the example flame detection circuitry 142), and/or the example memory 144 is/are hereby expressly defined to include a non-transitory computer readable storage device or storage disk such as a memory, a digital versatile disk (DVD), a compact disk (CD), a Blu-ray disk, etc., including the software and/or firmware. Further still, the example control system of the grill of FIG. 1 may include one or more elements, processes, and/or devices in addition to, or instead of, those illustrated in FIG. 1, and/or may include more than one of any or all of the illustrated elements, processes, and devices.

Flowcharts representative of example hardware logic circuitry, machine-readable instructions, hardware implemented state machines, and/or any combination thereof for implementing the control system of the grill 100 of FIG. 1 are shown in FIGS. 4-7. The machine-readable instructions may be one or more executable programs or portion(s) of an executable program for execution by processor circuitry, such as the processor circuitry 802 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although example programs are described with reference to the flowcharts illustrated in FIGS. 4-7, many other methods of implementing the example control system of the grill 100 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or any other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or any other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-7 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable medium" and "non-transitory computer-readable storage medium" are expressly defined to include any type of computer-readable storage device and/or storage disk and to exclude propagating signals and to exclude transmission media.

The terms "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

Figure 4:
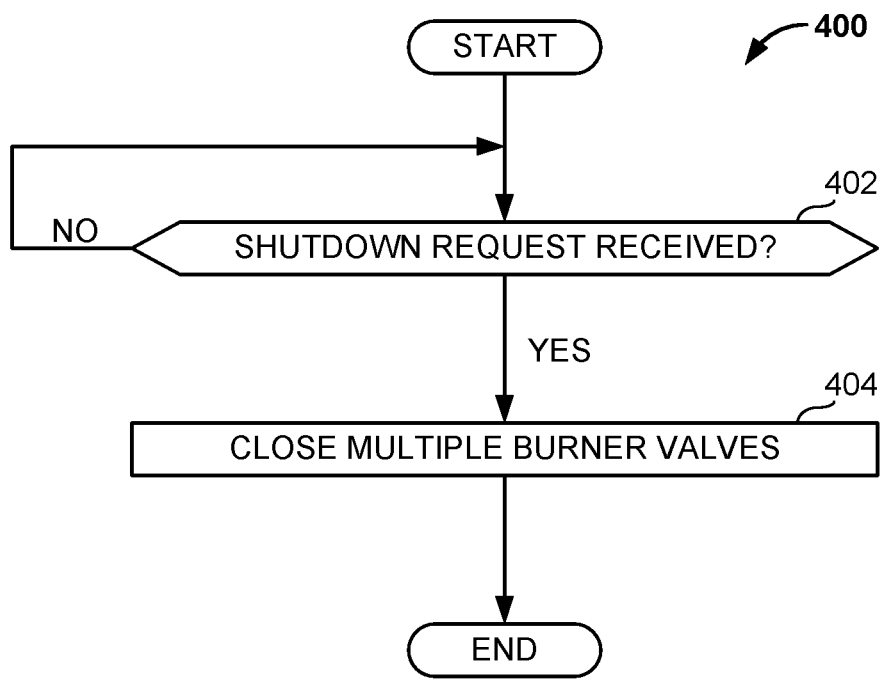
FIG. 4 is a flowchart representative of example machine-readable instructions and/or example operations that may be executed by processor circuitry to implement an automated shutdown process via the grill of FIG. 1.

FIG. 4 is a flowchart representative of example machine-readable instructions and/or example operations 400 that may be executed and/or instantiated by processor circuitry to implement an automated shutdown process via the grill 100 of FIG. 1. The machine-readable instructions and/or operations 400 of FIG. 4 begin at block 402 when the controller 138 of FIG. 1 determines whether a request to shut down the grill 100 of FIG. 1 (referred to herein with reference to FIG. 4 as a "shutdown request") has been received. For example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1. As another example, the controller 138 may determine that a shutdown request has been received based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1. As yet another example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1. If the controller 138 determines at block 402 that a shutdown request has not been received, control of the machine-readable instructions and/or operations 400 of FIG. 4 remains at block 402. If the controller 138 instead determines at block 402 that a shutdown request has been received, control of the machine-readable instructions and/or operations 400 of FIG. 4 proceeds to block 404.

At block 404, the valve control circuitry 140 of the controller 138 of FIG. 1 instructs, commands, signals, and/or otherwise causes multiple ones (e.g., all) of the burner valves (e.g., the first burner valve 112 and the second burner valve 114) of the grill 100 of FIG. 1 to close. For example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to concurrently close (e.g., the first burner valve 112 and the second burner valve 114 closing at substantially the same time). As another example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to sequentially close (e.g., the first burner valve 112 closing at a first time, followed by the second burner valve 114 closing at a second time subsequent to the first time). Following block 404, the machine-readable instructions and/or operations 400 of FIG. 4 end.

In the above-described example, the machine-readable instructions and/or operations 400 of FIG. 4 end at block 404. In other examples, the machine-readable instructions and/or operations 400 of FIG. 4 can instead include one or more additional blocks (e.g., following block 404) in which the flame detection circuitry 142 of the controller 138 of FIG. 1 determines whether multiple ones (e.g., all) of the burners (e.g., the first burner 102 and the second burner 104) of the grill 100 of FIG. 1 are extinguished (e.g., not ignited). If the flame detection circuitry 142 of the controller 138 indicates that the first burner 102 and the second burner 104 of the grill 100 have been extinguished in connection with the automated shutdown process of FIG. 4, the controller 138 determines that one or more valve control operation(s) (e.g., controlled by the valve control circuitry 140 of the controller 138) associated with the automated shutdown process were successfully performed. Conversely, if the flame detection circuitry 142 of the controller 138 indicates that the first burner 102 and/or the second burner 104 of the grill 100 has/have not been extinguished in connection with the automated shutdown process of FIG. 4, the controller 138 determines that one or more valve control operation(s) (e.g., controlled by the valve control circuitry 140 of the controller 138) associated with the automated shutdown process were not successfully performed. The flame detection circuitry 142 of the controller 138 of FIG. 1 can accordingly be utilized as a diagnostic tool with regard to determining and/or addressing the success and/or failure of the automated shutdown process of FIG. 4. In some examples, an indication from the flame detection circuitry 142 that one or more operation(s) associated with the automated shutdown process of FIG. 4 has/have failed may cause the controller 138 to re-instruct, re-command, and/or re-signal one or more component(s) of the control system of the grill 100 to repeat one or more previously-instructed, previously-commanded, and/or previously-signaled operation(s) associated with the automated shutdown process of FIG. 4.

Figure 5:
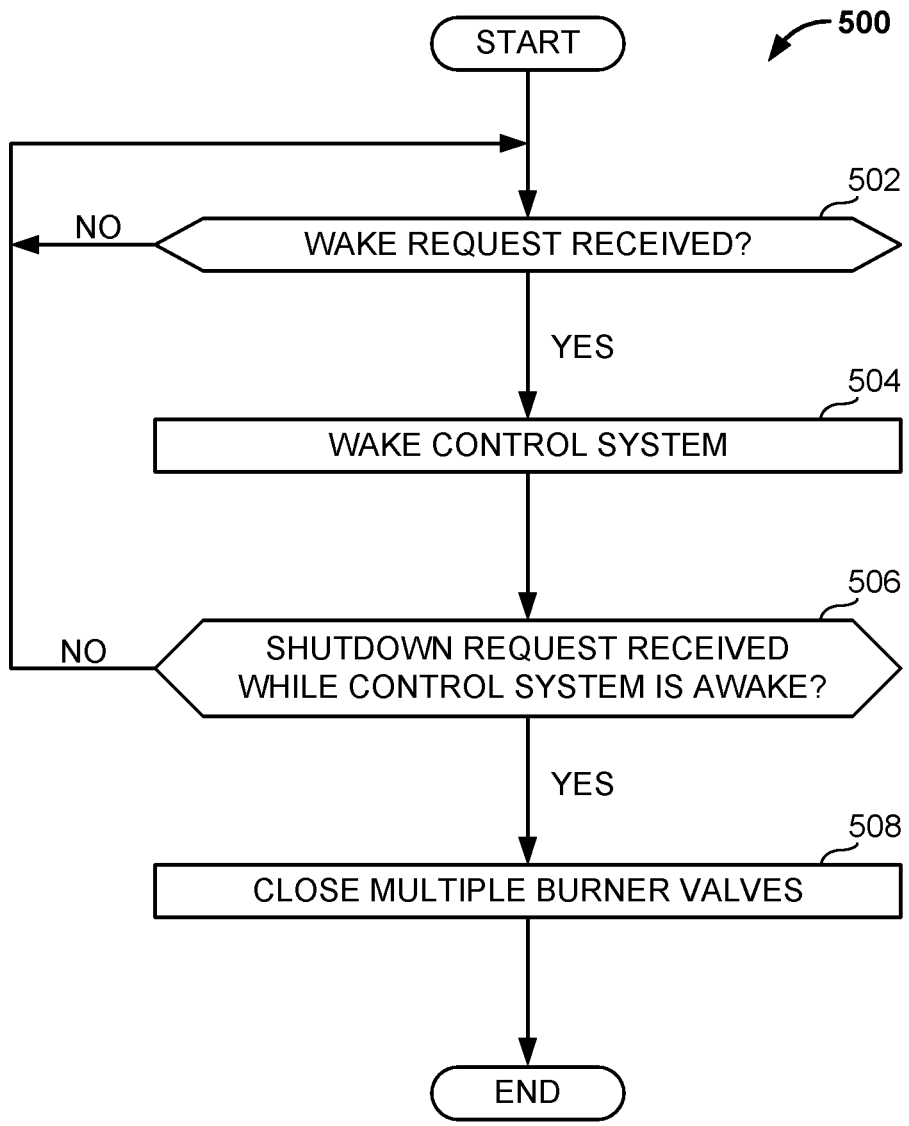
FIG. 5 is a flowchart representative of example machine-readable instructions and/or example operations that may be executed by processor circuitry to implement another automated shutdown process via the grill of FIG. 1.

FIG. 5 is a flowchart representative of example machine-readable instructions and/or example operations 500 that may be executed and/or instantiated by processor circuitry to implement another automated shutdown process via the grill 100 of FIG. 1. The machine-readable instructions and/or operations 500 of FIG. 5 begin at block 502 when the controller 138 of FIG. 1 determines whether a request to wake the control system of the grill 100 of FIG. 1 (referred to herein with reference to FIG. 5 as a "wake request") has been received. For example, the controller 138 may determine that a wake request has been received based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1. As another example, the controller 138 may determine that a wake request has been received based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1. As yet another example, the controller 138 may determine that a wake request has been received based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1. If the controller 138 determines at block 502 that a wake request has not been received, control of the machine-readable instructions and/or operations 500 of FIG. 5 remains at block 502. If the controller 138 instead determines at block 502 that a wake request has been received, control of the machine-readable instructions and/or operations 500 of FIG. 5 proceeds to block 504.

At block 504, the controller 138 of FIG. 1 instructs, commands, signals, and/or otherwise causes the control system of the grill 100 of FIG. 1 to wake. For example, the controller 138 of FIG. 1 may instruct, command, signal, and/or otherwise cause the control system of the grill 100 of FIG. 1 to transition from an inactive (e.g., sleep) state to an active (e.g., awake) state. Following block 504, control of the example machine-readable instructions and/or operations 500 of FIG. 5 proceeds to block 506.

At block 506, the controller 138 of FIG. 1 determines whether a request to shut down the grill 100 of FIG. 1 (referred to herein with reference to FIG. 5 as a "shutdown request") has been received while the control system of the grill 100 of FIG. 1 is awake. For example, the controller 138 may determine that a shutdown request has been received while the control system of the grill 100 is awake based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1 occurring while the control system of the grill 100 is awake. As another example, the controller 138 may determine that a shutdown request has been received while the control system of the grill 100 is awake based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1 while the control system of the grill 100 is awake. As yet another example, the controller 138 may determine that a shutdown request has been received while the control system of the grill 100 is awake based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1 while the control system of the grill 100 is awake. If the controller 138 determines at block 506 that a shutdown request has not been received while the control system of the grill 100 is awake, control of the machine-readable instructions and/or operations 500 of FIG. 5 returns to block 502. If the controller 138 instead determines at block 506 that a shutdown request has been received while the control system of the grill 100 is awake, control of the machine-readable instructions and/or operations 500 of FIG. 5 proceeds to block 508.

At block 508, the valve control circuitry 140 of the controller 138 of FIG. 1 instructs, commands, signals, and/or otherwise causes multiple ones (e.g., all) of the burner valves (e.g., the first burner valve 112 and the second burner valve 114) of the grill 100 of FIG. 1 to close. For example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to concurrently close (e.g., the first burner valve 112 and the second burner valve 114 closing at substantially the same time). As another example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to sequentially close (e.g., the first burner valve 112 closing at a first time, followed by the second burner valve 114 closing at a second time subsequent to the first time). Following block 508, the machine-readable instructions and/or operations 500 of FIG. 5 end.

In the above-described example, the machine-readable instructions and/or operations 500 of FIG. 5 end at block 508. In other examples, the machine-readable instructions and/or operations 500 of FIG. 5 can instead include one or more additional blocks (e.g., following block 508) in which the flame detection circuitry 142 of the controller 138 of FIG. 1 determines whether multiple ones (e.g., all) of the burners (e.g., the first burner 102 and the second burner 104) of the grill 100 of FIG. 1 are extinguished (e.g., not ignited). If the flame detection circuitry 142 of the controller 138 indicates that the first burner 102 and the second burner 104 of the grill 100 have been extinguished in connection with the automated shutdown process of FIG. 5, the controller 138 determines that one or more valve control operation(s) (e.g., controlled by the valve control circuitry 140 of the controller 138) associated with the automated shutdown process were successfully performed. Conversely, if the flame detection circuitry 142 of the controller 138 indicates that the first burner 102 and/or the second burner 104 of the grill 100 has/have not been extinguished in connection with the automated shutdown process of FIG. 5, the controller 138 determines that one or more valve control operation(s) (e.g., controlled by the valve control circuitry 140 of the controller 138) associated with the automated shutdown process were not successfully performed. The flame detection circuitry 142 of the controller 138 of FIG. 1 can accordingly be utilized as a diagnostic tool with regard to determining and/or addressing the success and/or failure of the automated shutdown process of FIG. 5. In some examples, an indication from the flame detection circuitry 142 that one or more operation(s) associated with the automated shutdown process of FIG. 5 has/have failed may cause the controller 138 to re-instruct, re-command, and/or re-signal one or more component(s) of the control system of the grill 100 to repeat one or more previously-instructed, previously-commanded, and/or previously-signaled operation(s) associated with the automated shutdown process of FIG. 5.

Figure 6:
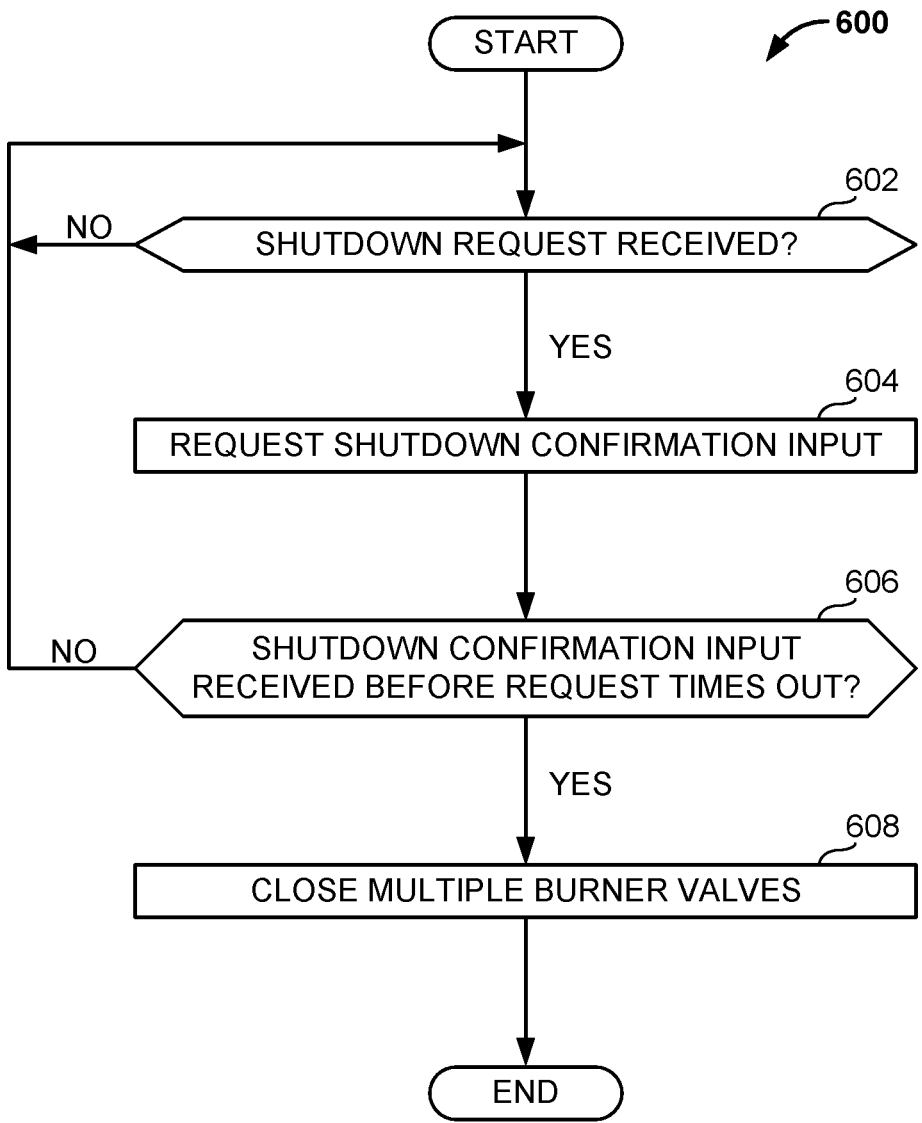
FIG. 6 is a flowchart representative of example machine-readable instructions and/or example operations that may be executed by processor circuitry to implement another automated shutdown process via the grill of FIG. 1.

FIG. 6 is a flowchart representative of example machine-readable instructions and/or example operations 600 that may be executed and/or instantiated by processor circuitry to implement another automated shutdown process via the grill 100 of FIG. 1. The machine-readable instructions and/or operations 600 of FIG. 6 begin at block 602 when the controller 138 of FIG. 1 determines whether a request to shut down the grill 100 of FIG. 1 (referred to herein with reference to FIG. 6 as a "shutdown request") has been received. For example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1. As another example, the controller 138 may determine that a shutdown request has been received based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1. As yet another example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1. If the controller 138 determines at block 602 that a shutdown request has not been received, control of the machine-readable instructions and/or operations 600 of FIG. 6 remains at block 602. If the controller 138 instead determines at block 602 that a shutdown request has been received, control of the machine-readable instructions and/or operations 600 of FIG. 6 proceeds to block 604.

At block 604, the controller 138 of FIG. 1 instructs, commands, signals, and/or otherwise causes the user interface 128 of the grill 100 of FIG. 1 to present a request for a user-based shutdown confirmation input (referred to herein with reference to FIG. 6 as a "shutdown confirmation request"). In some examples, the controller 138 of FIG. 1 additionally or alternatively causes the network interface 134 of the grill 100 to transmit the shutdown confirmation request to one or more of the remote device(s) 146 of FIG. 1. In some examples, the shutdown confirmation request transmitted via the network interface 134 may be the same as, or may mimic the shutdown confirmation request presented via the user interface 128. In some examples, the controller 138 initiates a timer at block 604 in association with the shutdown confirmation request, whereby the timer provides and/or imposes a time frame, a time period, and/or a time limit by which a response to the shutdown confirmation request must be made and/or received. Following block 604, control of the machine-readable instructions and/or operations 600 of FIG. 6 proceeds to block 606.

At block 606, the controller 138 of FIG. 1 determines whether a shutdown confirmation input has been received at the grill 100 before the timer associated with the shutdown confirmation request of block 604 times out. For example, the controller 138 may determine that a shutdown confirmation input has been received before the timer associated with the shutdown confirmation request of block 604 times out based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1 occurring before the timer associated with the shutdown confirmation request of block 604 times out. As another example, the controller 138 may determine that a shutdown confirmation input has been received before the timer associated with the shutdown confirmation request of block 604 times out based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1 before the timer associated with the shutdown confirmation request of block 604 times out. As yet another example, the controller 138 may determine that a shutdown confirmation input has been received before the timer associated with the shutdown confirmation request of block 604 times out based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1 before the timer associated with the shutdown confirmation request of block 604 times out. If the controller 138 determines at block 606 that a shutdown confirmation input has not been received at the grill 100 before the timer associated with the shutdown confirmation request of block 604 times out, control of the machine-readable instructions and/or operations 600 of FIG. 6 returns to block 602. If the controller 138 instead determines at block 606 that a shutdown confirmation input has been received before the timer associated with the shutdown confirmation request of block 604 times out, control of the machine-readable instructions and/or operations 600 of FIG. 6 proceeds to block 608.

At block 608, the valve control circuitry 140 of the controller 138 of FIG. 1 instructs, commands, signals, and/or otherwise causes multiple ones (e.g., all) of the burner valves (e.g., the first burner valve 112 and the second burner valve 114) of the grill 100 of FIG. 1 to close. For example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to concurrently close (e.g., the first burner valve 112 and the second burner valve 114 closing at substantially the same time). As another example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to sequentially close (e.g., the first burner valve 112 closing at a first time, followed by the second burner valve 114 closing at a second time subsequent to the first time). Following block 608, the machine-readable instructions and/or operations 600 of FIG. 6 end.

In the above-described example, the machine-readable instructions and/or operations 600 of FIG. 6 end at block 608. In other examples, the machine-readable instructions and/or operations 600 of FIG. 6 can instead include one or more additional blocks (e.g., following block 608) in which the flame detection circuitry 142 of the controller 138 of FIG. 1 determines whether multiple ones (e.g., all) of the burners (e.g., the first burner 102 and the second burner 104) of the grill 100 of FIG. 1 are extinguished (e.g., not ignited). If the flame detection circuitry 142 of the controller 138 indicates that the first burner 102 and the second burner 104 of the grill 100 have been extinguished in connection with the automated shutdown process of FIG. 6, the controller 138 determines that one or more valve control operation(s) (e.g., controlled by the valve control circuitry 140 of the controller 138) associated with the automated shutdown process were successfully performed. Conversely, if the flame detection circuitry 142 of the controller 138 indicates that the first burner 102 and/or the second burner 104 of the grill 100 has/have not been extinguished in connection with the automated shutdown process of FIG. 6, the controller 138 determines that one or more valve control operation(s) (e.g., controlled by the valve control circuitry 140 of the controller 138) associated with the automated shutdown process were not successfully performed. The flame detection circuitry 142 of the controller 138 of FIG. 1 can accordingly be utilized as a diagnostic tool with regard to determining and/or addressing the success and/or failure of the automated shutdown process of FIG. 6. In some examples, an indication from the flame detection circuitry 142 that one or more operation(s) associated with the automated shutdown process of FIG. 6 has/have failed may cause the controller 138 to re-instruct, re-command, and/or re-signal one or more component(s) of the control system of the grill 100 to repeat one or more previously-instructed, previously-commanded, and/or previously-signaled operation(s) associated with the automated shutdown process of FIG. 6.

Figure 7:
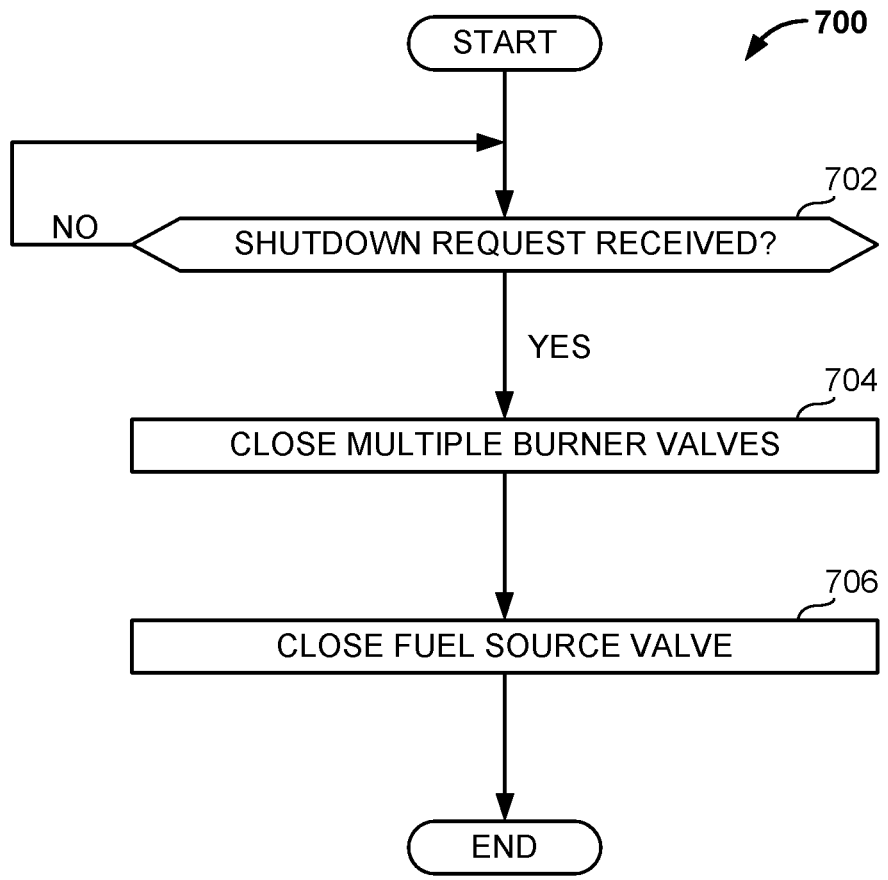
FIG. 7 is a flowchart representative of example machine-readable instructions and/or example operations that may be executed by processor circuitry to implement another automated shutdown process via the grill of FIG. 1.

FIG. 7 is a flowchart representative of example machine-readable instructions and/or example operations 700 that may be executed and/or instantiated by processor circuitry to implement another automated shutdown process via the grill 100 of FIG. 1. The machine-readable instructions and/or operations 700 of FIG. 7 begin at block 702 when the controller 138 of FIG. 1 determines whether a request to shut down the grill 100 of FIG. 1 (referred to herein with reference to FIG. 7 as a "shutdown request") has been received. For example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more of the input device(s) 130 (e.g., a button, a dial, a knob, a switch, a touchscreen, etc.) of the user interface 128 of FIG. 1. As another example, the controller 138 may determine that a shutdown request has been received based on a user input, a user selection, and/or a user interaction (e.g., a press, a push, a pull, a rotation, etc.) of, to, and/or with the first control knob 122 and/or the second control knob 126 of FIG. 1, as sensed, measured, and or detected via the first encoder 120 and/or the second encoder 124 of FIG. 1. As yet another example, the controller 138 may determine that a shutdown request has been received based on a user input, a user selection, and/or a user interaction (e.g., a press, a push, a pull, a rotation, a click, a flip, a swipe, a touch, etc.) of, to, and/or with one or more input device(s) (e.g., a button, a dial, a knob, a switch, a touchscreen, etc.) of one of the remote device(s) 146 of FIG. 1, as received and/or detected via the network interface 134 of FIG. 1. If the controller 138 determines at block 702 that a shutdown request has not been received, control of the machine-readable instructions and/or operations 700 of FIG. 7 remains at block 702. If the controller 138 instead determines at block 702 that a shutdown request has been received, control of the machine-readable instructions and/or operations 700 of FIG. 7 proceeds to block 704.

At block 704, the valve control circuitry 140 of the controller 138 of FIG. 1 instructs, commands, signals, and/or otherwise causes multiple ones (e.g., all) of the burner valves (e.g., the first burner valve 112 and the second burner valve 114) of the grill 100 of FIG. 1 to close. For example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to concurrently close (e.g., the first burner valve 112 and the second burner valve 114 closing at substantially the same time). As another example, the valve control circuitry 140 of the controller 138 may instruct, command, signal, and/or otherwise cause multiple ones (e.g., all) of the burner valves (e.g., the first burner valve 112 and the second burner valve 114) of the grill 100 of FIG. 1 to sequentially close (e.g., the first burner valve 112 closing at a first time, followed by the second burner valve 114 closing at a second time subsequent to the first time). Following block 704, control of the machine-readable instructions and/or operations 700 of FIG. 7 proceeds to block 706.

At block 706, the valve control circuitry 140 of the controller 138 of FIG. 1 instructs, commands, signals, and/or otherwise causes the fuel source valve 108 of the grill 100 of FIG. 1 to close. Following block 704, the machine-readable instructions and/or operations 700 of FIG. 7 end.

In the above-described example, the machine-readable instructions and/or operations 700 of FIG. 7 end at block 706. In other examples, the machine-readable instructions and/or operations 700 of FIG. 7 can instead include one or more additional blocks (e.g., following block 706) in which the flame detection circuitry 142 of the controller 138 of FIG. 1 determines whether multiple ones (e.g., all) of the burners (e.g., the first burner 102 and the second burner 104) of the grill 100 of FIG. 1 are extinguished (e.g., not ignited). If the flame detection circuitry 142 of the controller 138 indicates that the first burner 102 and the second burner 104 of the grill 100 have been extinguished in connection with the automated shutdown process of FIG. 7, the controller 138 determines that one or more valve control operation(s) (e.g., controlled by the valve control circuitry 140 of the controller 138) associated with the automated shutdown process were successfully performed. Conversely, if the flame detection circuitry 142 of the controller 138 indicates that the first burner 102 and/or the second burner 104 of the grill 100 has/have not been extinguished in connection with the automated shutdown process of FIG. 7, the controller 138 determines that one or more valve control operation(s) (e.g., controlled by the valve control circuitry 140 of the controller 138) associated with the automated shutdown process were not successfully performed. The flame detection circuitry 142 of the controller 138 of FIG. 1 can accordingly be utilized as a diagnostic tool with regard to determining and/or addressing the success and/or failure of the automated shutdown process of FIG. 7. In some examples, an indication from the flame detection circuitry 142 that one or more operation(s) associated with the automated shutdown process of FIG. 7 has/have failed may cause the controller 138 to re-instruct, re-command, and/or re-signal one or more component(s) of the control system of the grill 100 to repeat one or more previously-instructed, previously-commanded, and/or previously-signaled operation(s) associated with the automated shutdown process of FIG. 7.

Figure 8:
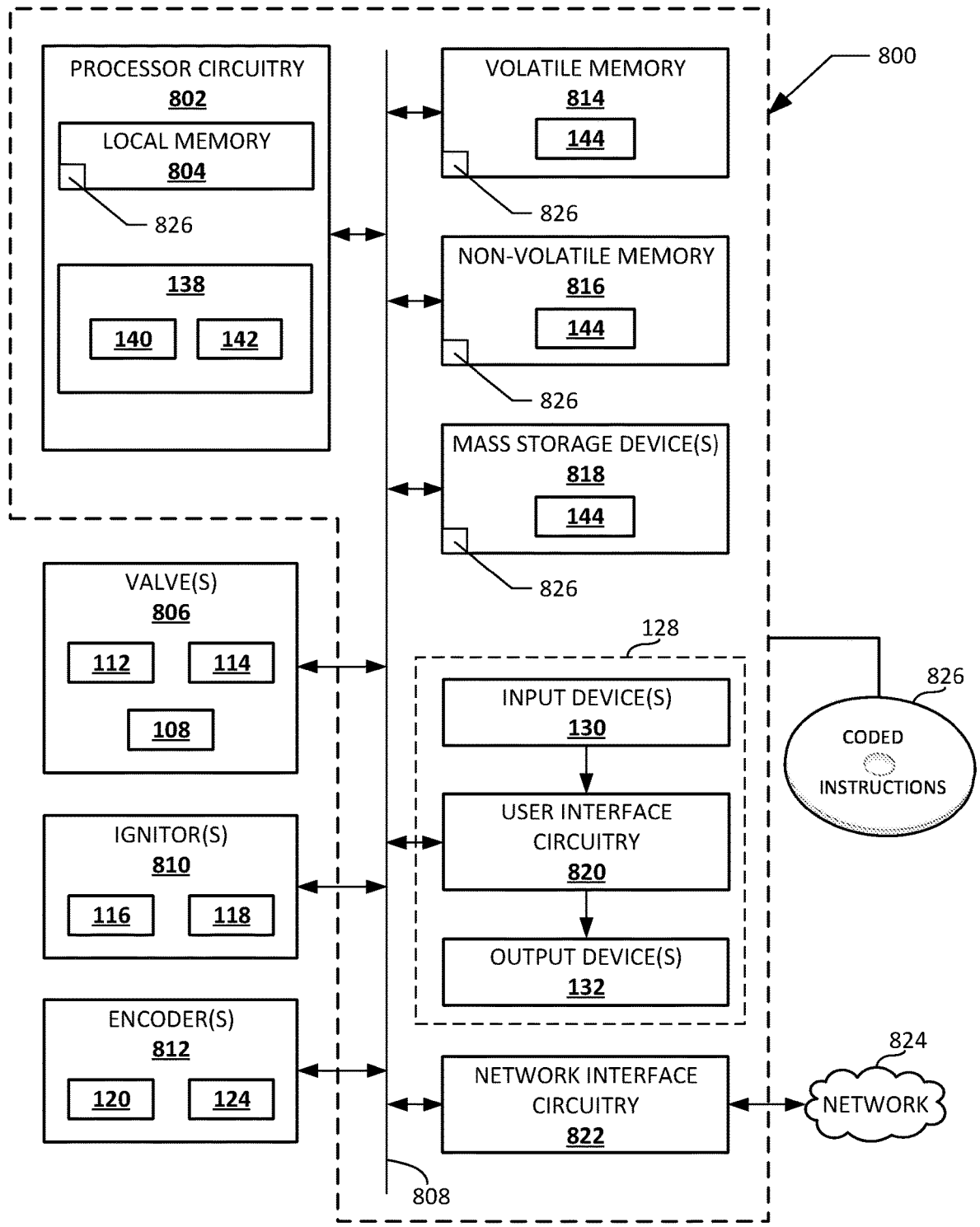
FIG. 8 is a block diagram of an example processor platform including processor circuitry structured to execute and/or instantiate the machine-readable instructions and/or operations of FIGS. 4-7 to implement the grill of FIG. 1.

FIG. 8 is a block diagram of an example processor platform 800 including processor circuitry structured to execute and/or instantiate the machine-readable instructions and/or operations of FIGS. 4-7 to implement the grill 100 of FIG. 1. The processor platform 800 of the illustrated example includes processor circuitry 802. The processor circuitry 802 of the illustrated example is hardware. For example, the processor circuitry 802 can be implemented by one or more integrated circuit(s), logic circuit(s), FPGA(s), microprocessor(s), CPU(s), GPU(s), DSP(s), and/or microcontroller(s) from any desired family or manufacturer. The processor circuitry 802 may be implemented by one or more semiconductor based (e.g., silicon based) device(s). In this example, the processor circuitry 802 implements the controller 138 of FIG. 1, including the valve control circuitry 140 and the flame detection circuitry 142 of the controller 138.

The processor circuitry 802 of the illustrated example includes a local memory 804 (e.g., a cache, registers, etc.). The processor circuitry 802 is in electrical communication with one or more valve(s) 806 via a bus 808. In this example, the valve(s) 806 include the fuel source valve 108, the first burner valve 112, and the second burner valve 114 of FIG. 1. The processor circuitry 802 is also in electrical communication with one or more ignitor(s) 810 via the bus 808. In this example, the ignitor(s) 810 include the first ignitor 116 and the second ignitor 118 of FIG. 1. The processor circuitry 802 is also in electrical communication with one or more encoder(s) 812 via the bus 808. In this example, the encoder(s) 812 include the first encoder 120 and the second encoder 124 of FIG. 1.

The processor circuitry 802 is also in electrical communication with a main memory via the bus 808, with the main memory including a volatile memory 814 and a non-volatile memory 816. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller.

The processor platform 800 of the illustrated example also includes one or more mass storage device(s) 818 to store software and/or data. Examples of such mass storage device(s) 818 include magnetic storage devices, optical storage devices, floppy disk drives, HDDs, CDs, Blu-ray disk drives, redundant array of independent disks (RAID) systems, solid state storage devices such as flash memory devices, and DVD drives. In the illustrated example of FIG. 8, one or more of the volatile memory 814, the non-volatile memory 816, and/or the mass storage device(s) 818 implement(s) the memory 144 of FIG. 1.

The processor platform 800 of the illustrated example also includes user interface circuitry 820. The user interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In the illustrated example, one or more input device(s) 130 are connected to the user interface circuitry 820. The input device(s) 130 permit(s) a user to enter data and/or commands into the processor circuitry 802. The input device(s) 130 can be implemented by, for example, one or more button(s), dial(s), knob(s), switch(es), touchscreen(s), audio sensor(s), microphone(s), image sensor(s), and/or camera(s). One or more output device(s) 132 are also connected to the user interface circuitry 820 of the illustrated example. The output device(s) 132 can be implemented, for example, by one or more display device(s) (e.g., light emitting diode(s) (LED(s)), organic light emitting diode(s) (OLED(s)), liquid crystal display(s) (LCD(s)), cathode ray tube (CRT) display(s), in-place switching (IPS) display(s), touchscreen(s), etc.), tactile output device(s), and/or speaker(s). The user interface circuitry 820 of the illustrated example, thus, typically includes a graphics driver card, a graphics driver chip, and/or graphics processor circuitry such as a GPU. In the illustrated example of FIG. 8, the user interface circuitry 820, the input device(s) 130, and the output device(s) 132 collectively implement the user interface 128 of FIG. 1.

The processor platform 800 of the illustrated example also includes network interface circuitry 822. The network interface circuitry 822 includes one or more communication device(s) (e.g., transmitter(s), receiver(s), transceiver(s), modem(s), gateway(s), wireless access point(s), etc.) to facilitate exchange of data with external machines (e.g., computing devices of any kind, including the remote device(s) 146 of FIG. 1) by a network 824. The communication can be by, for example, an Ethernet connection, a digital subscriber line (DSL) connection, a telephone line connection, a coaxial cable system, a satellite system, a wireless system, a cellular telephone system, an optical connection, etc. In the illustrated example of FIG. 8, the network interface circuitry 822 implements the network interface 134 (e.g., including the communication device(s) 136) of FIG. 1.

Coded instructions 826 including the above-described machine-readable instructions and/or operations of FIGS. 4-7 may be stored the local memory 804, in the volatile memory 814, in the non-volatile memory 816, on the mass storage device(s) 818, and/or on a removable non-transitory computer-readable storage medium such as a flash memory stick, a dongle, a CD, or a DVD.

Figure 9:
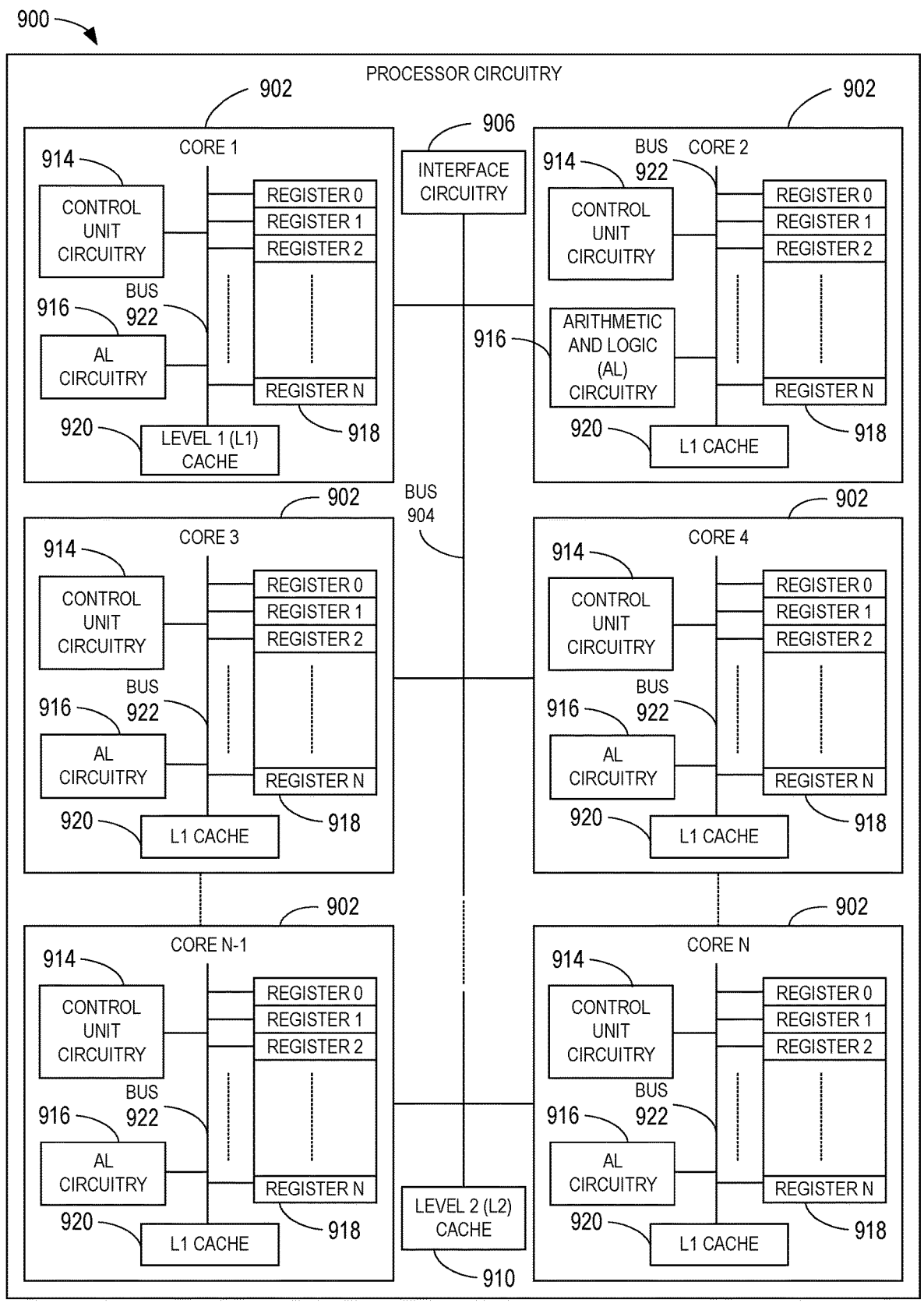
FIG. 9 is a block diagram of an example implementation of the processor circuitry of FIG. 8.

FIG. 9 is a block diagram of an example implementation of the processor circuitry 802 of FIG. 8. In this example, the processor circuitry 802 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine-readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine-readable instructions and/or operations represented by the flowcharts of FIGS. 4-7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally, or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 922 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)), and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
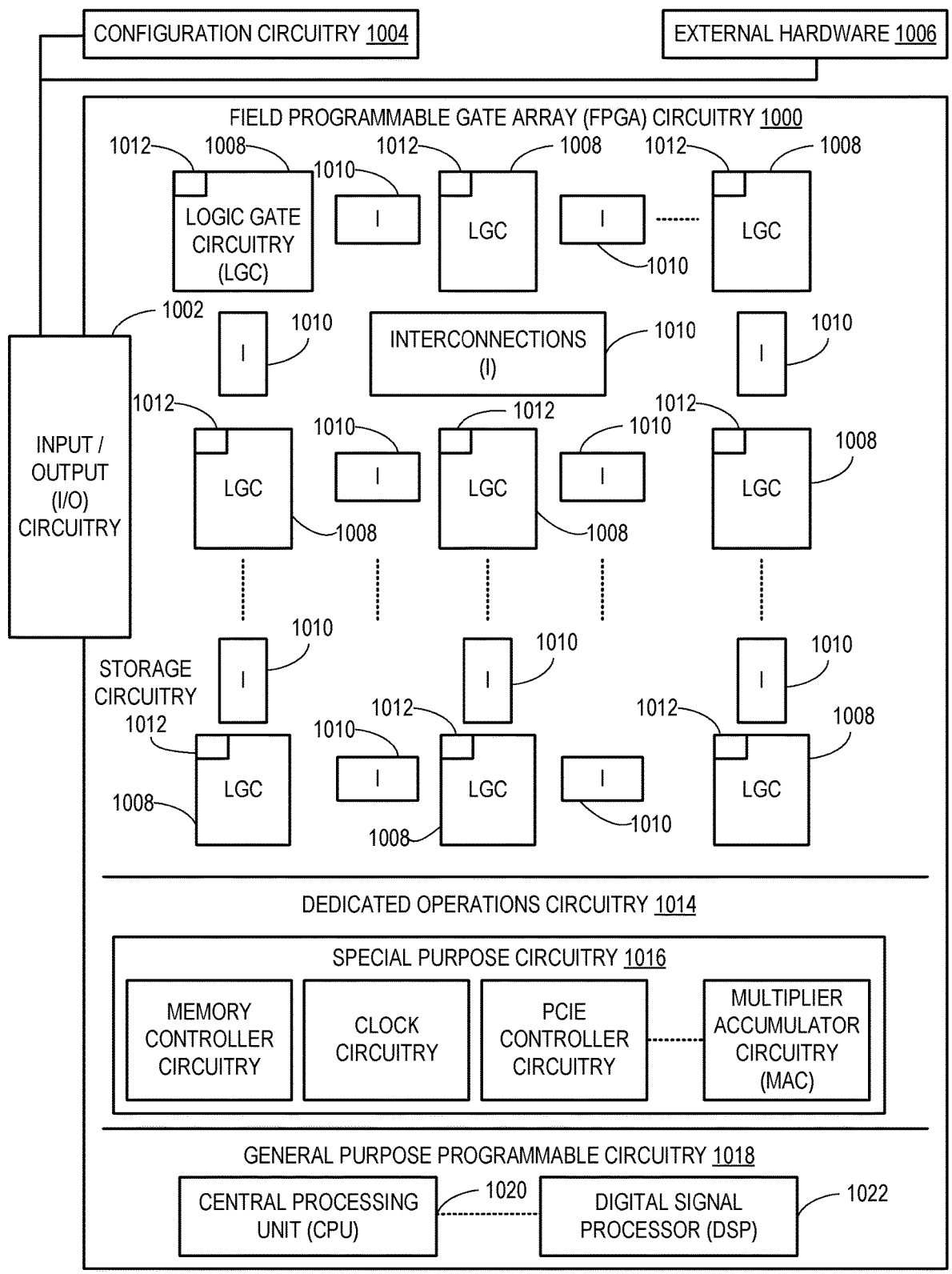
FIG. 10 is a block diagram of another example implementation of the processor circuitry of FIG. 8.

FIG. 10 is a block diagram of another example implementation of the processor circuitry 802 of FIG. 8. In this example, the processor circuitry 802 is implemented by FPGA circuitry 1000. The FPGA circuitry 1000 can be used, for example, to perform operations that could otherwise be performed by the example microprocessor 900 of FIG. 9 executing corresponding machine-readable instructions. However, once configured, the FPGA circuitry 1000 instantiates the machine-readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine-readable instructions and/or operations represented by the flowcharts of FIGS. 4-7, but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine-readable instructions and/or operations represented by the flowcharts of FIGS. 4-7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 4-7. As such, the FPGA circuitry 1000 may be structured to effectively instantiate some or all of the machine-readable instructions of the flowcharts of FIGS. 4-7 as dedicated logic circuits to perform the operations corresponding to those software instructions in a dedicated manner analogous to an ASIC. Therefore, the FPGA circuitry 1000 may perform the operations corresponding to the some or all of the machine-readable instructions of FIGS. 4-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10 includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine-readable instructions to configure the FPGA circuitry 1000, or portion(s) thereof. In some such examples, the configuration circuitry 1004 may obtain the machine-readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine-readable instructions of FIGS. 4-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 802 of FIG. 8, many other approaches are contemplated. For example, as mentioned above, modern FPGA circuitry may include an on-board CPU, such as one or more of the example CPU 1020 of FIG. 10. Therefore, the processor circuitry 802 of FIG. 8 may additionally be implemented by combining the example microprocessor 900 of FIG. 9 and the example FPGA circuitry 1000 of FIG. 10. In some such hybrid examples, a first portion of the machine-readable instructions represented and/or operations by the flowcharts of FIGS. 4-7 may be executed by one or more of the cores 902 of FIG. 9 and a second portion of the machine-readable instructions and/or operations represented by the flowcharts of FIGS. 4-7 may be executed by the FPGA circuitry 1000 of FIG. 10.

In some examples, the processor circuitry 802 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 802 of FIG. 8, which may be in one or more packages. For example, the XPU may include a CPU in one package, a DSP in another package, a GPU in yet another package, and an FPGA in still yet another package.

From the foregoing, it will be appreciated that the above-disclosed methods and apparatus for automating shutdown processes of gas grills advantageously require a reduced degree (e.g., a reduced number) of user (e.g., human) interaction(s) to shutdown multiple (e.g., all) burners of a gas grill relative to the known shutdown processes described above that require a high degree (e.g., a high number) of user interaction(s) to shutdown multiple (e.g., all) burners of a gas grill. In some examples, automated shutdown processes disclosed herein require as few as two user interactions to shutdown multiple (e.g., all) burners of a gas grill. In other examples, automated shutdown processes disclosed herein require as few as one user interaction to shutdown multiple (e.g., all) burners of a gas grill. Implementing the automated shutdown processes disclosed herein to reduce the degree (e.g., the number) of user interaction(s) required to shutdown multiple (e.g., all) burners of a gas grill advantageously makes the shutdown process less cumbersome in terms of the extent of user involvement that is required in connection with the shutdown process. The automated shutdown processes disclosed herein thereby provide a user experience that is improved relative to that provided by known shutdown processes for gas grills.

In some examples, a grill is disclosed. In some disclosed examples, the grill includes a first burner, a second burner, a first burner valve operatively positioned between the first burner and a manifold of the grill, and a second burner valve operatively positioned between the second burner and the manifold. In some disclosed examples, the grill further comprises a controller operatively coupled to the first burner valve and the second burner valve. In some disclosed examples, the controller, in response to determining that a shutdown request has been received at the grill, is to instruct the first burner valve and the second burner valve to close.

In some disclosed examples, the shutdown request is to be received via a user interface of the grill based on a user interaction with an input device of the user interface.

In some disclosed examples, the shutdown request is to be received via a network interface of the grill. In some disclosed examples, the network interface is to receive the shutdown request from a remote device based on a user interaction with an input device of the remote device.

In some disclosed examples, the shutdown request is to be received via an encoder of the grill. In some disclosed examples, the encoder is to receive the shutdown request based on a user interaction with a control knob of the grill. In some disclosed examples, the control knob is mechanically coupled to the encoder.

In some disclosed examples, the controller is to instruct the first burner valve and the second burner valve to close in response to the controller determining that the shutdown request was received at the grill while a control system of the grill is awake.

In some disclosed examples, the controller, subsequent to determining that the shutdown request has been received at the grill, and prior to instructing the first burner valve and the second burner valve to close, is to determine that a shutdown confirmation input has been received at the grill before a timer associated with a request for the shutdown confirmation input has expired.

In some disclosed examples, the controller is to instruct the first burner valve and the second burner valve to concurrently close.

In some disclosed examples, the controller is to instruct the first burner valve and the second burner valve to sequentially close.

In some disclosed examples, the controller, in response to determining that the shutdown request has been received at the grill, is further to instruct a fuel source valve to close. In some disclosed examples, the fuel source valve is operatively positioned between a fuel source and the manifold.

In some examples, a method for shutting down a grill is disclosed. In some disclosed examples, the method comprises determining, via a controller of the grill, whether a shutdown request has been received at the grill. In some disclosed examples, the method further comprises, in response to determining that the shutdown request has been received at the grill, instructing, via the controller, a first burner valve of the grill and a second burner valve of the grill to close. In some disclosed examples, the first burner valve is operatively positioned between a first burner of the grill and a manifold of the grill, and the second burner valve is operatively positioned between a second burner of the grill and the manifold.

In some disclosed examples, the shutdown request is received via a user interface of the grill based on a user interaction with an input device of the user interface.

In some disclosed examples, the shutdown request is received via a network interface of the grill. In some disclosed examples, the network interface receives the shutdown request from a remote device based on a user interaction with an input device of the remote device.

In some disclosed examples, the shutdown request is received via an encoder of the grill. In some disclosed examples, the encoder receives the shutdown request based on a user interaction with a control knob of the grill. In some disclosed examples, the control knob is mechanically coupled to the encoder.

In some disclosed examples, instructing the first burner valve and the second burner valve to close occurs in response to determining, via the controller, that the shutdown request was received at the grill while a control system of the grill is awake.

In some disclosed examples, the method further comprises, subsequent to determining that the shutdown request has been received at the grill, and prior to instructing the first burner valve and the second burner valve to close, determining, via the controller, that a shutdown confirmation input has been received at the grill before a timer associated with a request for the shutdown confirmation input has expired.

In some disclosed examples, instructing the first burner valve and the second burner valve to close includes instructing the first burner valve and the second burner valve to concurrently close.

In some disclosed examples, instructing the first burner valve and the second burner valve to close includes instructing the first burner valve and the second burner valve to sequentially close.

In some disclosed examples, the method further comprises, in response to determining that the shutdown request has been received at the grill, instructing, via the controller, a fuel source valve to close. In some disclosed examples, the fuel source valve is operatively positioned between a fuel source and the manifold.

In some examples, a non-transitory computer-readable medium comprising computer-readable instructions is disclosed. In some disclosed examples, the computer-readable instructions, when executed, cause one or more processors of a grill to determine whether a shutdown request has been received at the grill. In some disclosed examples, the computer-readable instructions, when executed, cause the one or more processors, in response to determining that the shutdown request has been received at the grill, to instruct a first burner valve of the grill and a second burner valve of the grill to close. In some disclosed examples, the first burner valve is operatively positioned between a first burner of the grill and a manifold of the grill, and the second burner valve is operatively positioned between a second burner of the grill and the manifold.

In some disclosed examples, the shutdown request is received via a user interface of the grill based on a user interaction with an input device of the user interface.

In some disclosed examples, the shutdown request is received via a network interface of the grill. In some disclosed examples, the network interface receives the shutdown request from a remote device based on a user interaction with an input device of the remote device.

In some disclosed examples, the shutdown request is received via an encoder of the grill. In some disclosed examples, the encoder of the grill receives the shutdown request based on a user interaction with a control knob of the grill. In some disclosed examples, the control knob is mechanically coupled to the encoder.

In some disclosed examples, the computer-readable instructions, when executed, cause the one or more processors to instruct the first burner valve and the second burner valve to close in response to determining, via the one or more processors, that the shutdown request was received at the grill while a control system of the grill is awake.

In some disclosed examples, the computer-readable instructions, when executed, further cause the one or more processors, subsequent to determining that the shutdown request has been received at the grill, and prior to instructing the first burner valve and the second burner valve to close, to determine that a shutdown confirmation input has been received at the grill before a timer associated with a request for the shutdown confirmation input has expired.

In some disclosed examples, the computer-readable instructions, when executed, cause the one or more processors to instruct the first burner valve and the second burner valve to concurrently close.

In some disclosed examples, the computer-readable instructions, when executed, cause the one or more processors to instruct the first burner valve and the second burner valve to sequentially close.

In some disclosed examples, the computer-readable instructions, when executed, further cause the one or more processors, in response to determining that the shutdown request has been received at the grill, to instruct a fuel source valve to close. In some disclosed examples, the fuel source valve is operatively positioned between a fuel source and the manifold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A grill, comprising:
 a first burner;
 a second burner;
 a first burner valve operatively positioned between the first burner and a manifold of the grill;
 a second burner valve operatively positioned between the second burner and the manifold; and
 a controller operatively coupled to the first burner valve and the second burner valve, wherein the controller, in response to determining that a shutdown request has been received at the grill, is to:
  initiate a timer associated with a shutdown confirmation request, the timer providing a time period by which a shutdown confirmation input must be received at the grill in response to the shutdown confirmation request;

determine whether the shutdown confirmation input has been received at the grill before the time period has expired; and in response to determining that the shutdown confirmation input has been received at the grill before the time period has expired, instruct the first burner valve and the second burner valve to close.

2. The grill of claim 1, wherein the shutdown request is to be received via a user interface of the grill based on a user interaction with an input device of the user interface.

3. The grill of claim 1, wherein the shutdown request is to be received via a network interface of the grill, and wherein the network interface is to receive the shutdown request from a remote device based on a user interaction with an input device of the remote device.

4. The grill of claim 1, wherein the shutdown request is to be received via an encoder of the grill, and wherein the encoder is to receive the shutdown request based on a user interaction with a control knob of the grill, the control knob being mechanically coupled to the encoder.

5. The grill of claim 1, wherein the controller is to instruct the first burner valve and the second burner valve to concurrently close.

6. The grill of claim 1, wherein the controller is to instruct the first burner valve and the second burner valve to sequentially close.

7. The grill of claim 1, wherein the controller, in response to determining that the shutdown confirmation request has been received at the grill before the time period has expired, is further to instruct a fuel source valve to close, the fuel source valve being operatively positioned between a fuel source and the manifold.

8. A method for shutting down a grill, the method comprising:

determining, via a controller of the grill, whether a shutdown request has been received at the grill; and in response to determining that the shutdown request has been received at the grill:

initiating, via the controller, a timer associated with a shutdown confirmation request, the timer providing a time period by which a shutdown confirmation input must be received at the grill in response to the shutdown confirmation request;

determining, via the controller, whether the shutdown confirmation input has been received at the grill before the time period has expired; and in response to determining that the shutdown confirmation input has been received at the grill before the time period has expired, instructing, via the controller, a first burner valve of the grill and a second burner valve of the grill to close, the first burner valve being operatively positioned between a first burner of the grill and a manifold of the grill, the second burner valve being operatively positioned between a second burner of the grill and the manifold.

9. The method of claim 8, wherein instructing the first burner valve and the second burner valve to close includes instructing the first burner valve and the second burner valve to concurrently close.

10. The method of claim 8, wherein instructing the first burner valve and the second burner valve to close includes instructing the first burner valve and the second burner valve to sequentially close.

11. The method of claim 8, further comprising, in response to determining that the shutdown confirmation request has been received at the grill before the time period has expired, instructing, via the controller, a fuel source valve to close, the fuel source valve being operatively positioned between a fuel source and the manifold.

12. A non-transitory computer-readable medium comprising computer-readable instructions that, when executed, cause one or more processors of a grill to at least:

determine whether a shutdown request has been received at the grill; and in response to determining that the shutdown request has been received at the grill:

initiate a timer associated with a shutdown confirmation request, the timer providing a time period by which a shutdown confirmation input must be received at the grill in response to the shutdown confirmation request;

determine whether the shutdown confirmation input has been received at the grill before the time period has expired; and in response to determining that the shutdown confirmation input has been received at the grill before the time period has expired, instruct a first burner valve of the grill and a second burner valve of the grill to close, the first burner valve being operatively positioned between a first burner of the grill and a manifold of the grill, the second burner valve being operatively positioned between a second burner of the grill and the manifold.

13. The non-transitory computer-readable medium of claim 12, wherein the computer-readable instructions, when executed, cause the one or more processors to instruct the first burner valve and the second burner valve to concurrently close.

14. The non-transitory computer-readable medium of claim 12, wherein the computer-readable instructions, when executed, cause the one or more processors to instruct the first burner valve and the second burner valve to sequentially close.

15. The grill of claim 1, wherein the controller, subsequent to instructing the first burner valve and the second burner valve to close, is to determine, via flame detection circuitry of the grill, whether the first burner and the second burner have been extinguished.

16. The grill of claim 15, wherein in response to determining that at least one of the first burner and the second burner has not been extinguished, the controller is to re-instruct the at least one of the first burner valve and the second burner valve to close.

17. The method of claim 8, further comprising, subsequent to instructing the first burner valve and the second burner valve to close, determining, via flame detection circuitry of the grill, whether the first burner and the second burner have been extinguished.

18. The method of claim 17, further comprising, in response to determining that at least one of the first burner and the second burner has not been extinguished, re-instructing, via the controller, the at least one of the first burner valve and the second burner valve to close.

19. The non-transitory computer-readable medium of claim 12, wherein the computer-readable instructions, when executed, cause the one or more processors, subsequent to instructing the first burner valve and the second burner valve to close, to determine, via flame detection circuitry of the grill, whether the first burner and the second burner have been extinguished.

20. The non-transitory computer-readable medium of claim 19, wherein the computer-readable instructions, when executed, cause the one or more processors, in response to determining that at least one of the first burner and the second burner has not been extinguished, to re-instruct the at least one of the first burner valve and the second burner valve to close.

* * * * *